United States Patent
Thieroff

[15] 3,689,878
[45] Sept. 5, 1972

[54] TRAFFIC MONITORING SYSTEM

[72] Inventor: Keith L. Thieroff, Grand Prairie, Tex.

[73] Assignee: LTV Aerospace Corporation, Dallas, Tex.

[22] Filed: June 23, 1970

[21] Appl. No.: 49,086

[52] U.S. Cl. ................................................340/31 R
[51] Int. Cl. ..............................................G08g 1/10
[58] Field of Search..................340/22, 31, 32, 33, 34

[56] References Cited

FOREIGN PATENTS OR APPLICATIONS 975,532   11/1964   Great Britain................340/31

*Primary Examiner*—William C. Cooper
*Attorney*—Donald W. Phillion and H. C. Goldwire

[57] ABSTRACT

A pair of start and stop sensors are positioned in each lane of a multi-lane road a known distance apart and are actuable by passing cars. Individual time delay means are associated with each lane and are energized each time the start sensor of the associated lane is energized. A computing means has a cycling state and a non-cycling state, and can be energized into its cycling state only under certain conditions, e.g., by the actuation of a start sensor at a time when the associated time delay means is de-energized. Also, under these conditions, a lockout logic means functions to energize the remaining time delay means for the cycle duration, thereby preventing said certain conditions from occurring in any other lane until the computing cycle is completed. During energization of any time delay means the subsequent actuation of the associated start sensor cannot energize the computing means. However, such subsequent actuation will re-energize the associated time delay means. Therefore, since a vehicle's front wheels pass over the start sensor before the rear wheels do, the computation cycle cannot be initiated by the rear wheels, which cycle would result in an incorrect speed computation. Other logic means cause a camera to optically track the monitored vehicle in accordance with its speed and lane, and take a picture thereof if the speed lies in predetermined ranges. Still other logic means disable the system in the event of a very slow moving vehicle, which might occur due to an accident or heavy traffic.

29 Claims, 17 Drawing Figures

KEITH L. THIEROFF
INVENTOR

TRAFFIC MONITORING SYSTEM

This invention relates generally to traffic control systems and more particularly to a traffic control system employing a pair of sensors positioned across the roadway in the path of the traffic being monitored.

In the prior art there are many types of speed detecting devices which employ road sensors to obtain the necessary data for determining velocity. The basic concept involved is as follows. A pair of sensors, including a start sensor and a stop sensor, are positioned on the roadway a known distance apart, each sensor being responsive to a car or other vehicle passing thereby. Means are provided to measure the time interval required for the car to pass between the start sensor and the stop sensor. Since both time and distance are now known it is possible to either compute velocity directly, or to refer to a table which gives velocity in terms of the elapsed time.

Since the speeds computed by these devices are often utilized as the basis for issuing speed violation tickets it is essential that they produce accurate measurements of speed. One requirement for producing such accurate measurements is that both the start and the stop sensors must be actuated by the same pair of wheels on a given vehicle. It is readily apparent that if the rear wheels of a vehicle activated the start sensor and the front wheels of the same vehicle activated the stop sensor, a lesser time would have elapsed than if the front wheels activated both the start and the stop sensors. Consequently, the velocity of the car would have been calculated to be higher than it actually was.

In most prior art systems a given car will activate the start sensor or switch as it passes thereby, and thus initiate the speed computation cycle. A short time later the car will pass the stop switch and thereby establish the time interval required to traverse the distance between the start and stop switches. The velocity computation can then be completed and the cycle of operation terminated, usually with a photograph of the vehicle being made in the event that a speed violation has occurred. In most of these prior art devices reactivation of the start switch by subsequently arriving vehicles will produce no effect upon the computation of the velocity of the first vehicle to activate the start switch. On the other hand, however, in most prior art devices it is possible for the cycle to become completed at a time when the rear and front wheels of the subsequent car are straddling the start switch. Under such conditions the start switch will be activated by the rear wheels of the subsequent vehicle. Thus when the front wheels of said subsequent vehicle pass the stop switch an incorrect measurement of the elapsed time will have occurred and an incorrect computation of velocity will result.

The problem is particularly prevalent in prior art devices which monitor a plurality of traffic lanes. In such devices separate start and stop sensors are placed in each lane, with each pair of sensors supplying input start and stop signals to a common computation device. Except in the case of very slow moving traffic, means are provided in some of these prior art devices to prevent a subsequent car in a given lane to be straddling the start switch at the termination of a cycle caused by a preceeding car in the same lane. However, no known systems have structure which will prevent cars in the other lanes from being in a straddling position over their start switches at the termination of said cycle, and thereby initiating a false speed computation.

Another problem appearing in prior art devices is the obtaining of a clear, unblurred picture of an offending vehicle. In the case of multi-lane traffic monitoring, this last-mentioned problem involves two separate considerations. The first consideration is the problem of obtaining sufficient detail in the photograph. In prior art multi-lane devices the camera is usually positioned so that it takes a photograph of all the lanes being monitored each time a violation occurs in any one of the lanes. It is apparent that the picture detail will be considerably less than that which would be obtained if the field of view of the camera contained substantially only the speeding vehicle.

The second consideration involves the blurring of the picture produced by the motion of the vehicle with respect to the camera.

Most prior art devices attempt to overcome the problem of blurring either by using a very fast film or by placing the camera either far enough in front of the car or far enough in back of the vehicle being photographed so that the component of velocity normal to the line of sight of the camera is small.

With today's high speed traffic flow, however, the usage of fast films does not produce satisfactory results. Nor has the placing of the camera substantial distances from the car being photographed produced good results. The latter expedient has the disadvantages of lessened picture detail due to the distance between camera and car and also has an increased risk of other traffic intervening between the camera and the car being photographed.

An additional problem inherent in known prior art system arises in the case of very slow moving traffic, or stop and start type traffic, which sometimes in cases of accidents or congested traffic. Under such conditions it is possible for a car to have its front and rear wheels straddle the start sensor for several seconds or more, during which time all of the time delays in the system will expire and the system will be in condition for a new cycle. Thus, when the straddling car moves forward, its rear wheels will actuate the start sensor and subsequently the front wheels will actuate the stop sensor, thereby producing an erroneously high speed computation.

It is a primary object of the invention to provide a speed detecting device wherein false cycling operations cannot occur, either in the single lane or in the multi-lane forms of the invention.

A second purpose of the invention is to provide a speed detecting device in which a clear, unblurred picture is taken both of the offending vehicle and its driver.

A third purpose of the invention is to provide a multi-lane speed detecting device in which a single camera can be focused in any lane containing a violating vehicle and further in which false operation of the device is not possible.

A fourth object of the invention is a multi-lane speed detecting device in which means are provided to enable the field of view of the camera to optically track the speeding vehicle, taking into account the speed of the vehicle, and thereby obtaining clear, unblurred pictures of the car and its driver, unblurred by the vehicle's motion.

A fifth aim of the invention is a multi-lane speed detecting device including means for enabling the field of view of the camera to optically track the speeding vehicle, taking into account not only the lane in which the car is traveling but also the speed of the car, and thereby obtaining clear pictures of the car and its driver, unblurred by the motion of the vehicle and well centered in the field of view of the camera.

A sixth purpose of the invention is a multi-lane speed detecting device in which the lane and the velocity of the vehicle are first determined and in which the field of view of camera is then caused to optically track the vehicle in accordance with the determined lane and the velocity to enable the taking of a clear, unblurred picture of the vehicle and its driver.

A seventh purpose of the invention is a multi-lane speed detecting device in which the lane and speed of the vehicle are determined first, and in which a camera assembly is thereby caused to be aimed to optically frame said vehicle in its field of view, thus permitting a more detailed photograph to be made of the vehicle as compared to an arrangement whereby all lanes are framed in the camera's field of view each time a picture is taken.

An eighth purpose of the invention is the improvement of speed detector means generally.

In accordance with the invention there are provided start and stop sensor means positioned a distance d apart in the path of the traffic flow and constructed to generate start and stop pulses, respectively, as they are actuated by a passing vehicle.

The speed detecting device has a cycling state and a non-cycling state. The cycling state is initiated when a pair of wheels passes the start sensor, but only if the device is in a non-cycling state at such time. Once the cycling state is initiated a computing means measures the time interval t between actuation of the start and stop sensors and then computes the velocity of the passing vehicle.

Tracking means are responsive to the computed velocity to enable the field of view of the camera to optically track the passing vehicle and to photograph the vehicle if the velocity thereof lies within predetermined ranges.

Also provided is a time delay pulse generator which is energized to produce a time delay pulse each time the start sensor is energized, whether the device is in its cycling state or in its non-cycling state. However, only if the device is in its non-cycling state at the time said start sensor is actuated will the cycling state be initiated.

Thereafter, during the presence of a time delay pulse, further initiation of the cycling state will be prevented by the presence of such time delay pulse. Thus, since the time delay pulse generating means is reenergized by each actuation of the start sensor, the possibility of a subsequent vehicle having its front and rear wheels straddle the start sensor at the termination of the cycling state is virtually eliminated, except in those cases where a car is traveling at a very low speed of a few miles per hour. To overcome the last-mentioned possibility, logic is provided to cause continuous and uninterrupted energization of said time delay pulse generating means until after said stop sensor is energized.

More specifically such logic means are provided which measures the time interval between successive actuations of said start sensor. If said measured time intervals should exceed a given maximum before the stop switch is actuated then a signal will be generated by said logic means which will disable the device and prevent the taking of a picture until the stop sensor is actuated and a new, subsequent cycle of operation is initiated.

In the multi-lane form of the invention separate start and stop sensors are positioned in each lane of traffic, with the output start and stop pulses of each pair of sensors being supplied to common computing and photographing means, but to individual time delay pulse generating means. The outputs of each of said individual time delay pulse generating means are also supplied to the common computing and photographing means.

Lockout logic, which is provided in the multi-lane form of the invention, responds to the initiation of the cycling state of the device by actuation of the start sensor in any given lane to prevent subsequent energization of the computation means by actuation of the start sensor in any other lane during the initiated cycling operation. Said lockout means, however, does not prevent the reenergization of the time delay pulse generating means in any of said lanes during said cycling operation, including said given lane.

Consequently, such lockout means in no way prevents the time delay pulse generating means in said other lanes from performing their normal function of preventing a car from straddling the start sensor in one of said other lanes at the termination of an operating cycle.

As indicated briefly above the time delay is of sufficient length to ensure that a car traveling above a minimum rate of speed will have its rear wheels pass over the start sensor before the expiration of said time delay pulse.

As in the case of the single lane mode, logic is provided to prevent false operation in those instances where cars are traveling at an extremely low rate of speed, such as might occur for example in very heavy rush hour traffic, when it is possible that said time delay pulse might terminate after the front wheels of the vehicle have passed over the start sensor but the rear wheels have not.

Also provided in the multi-lane form of the invention are logic means which respond to the initiation of a cycle of operation to energize a servo motor which then functions to aim the camera at the lane in which the car is traveling which initiated said cycle.

Further logic means are provided to then produce a voltage whose magnitude is determined not only by the velocity of the car but also by the lane the car occupies, to cause said camera to optically track the car after the occurrence of a speed violation has been determined.

It is to be noted that in the preferred embodiment of the invention the camera itself is not driven by the servo motor. Rather a mirror, which has much less mass than the camera, is driven by the servo motor to optically track the vehicle and reflect the image thereof into the camera lens.

The above-mentioned and other objects and features of the invention will be more fully understood from the following detailed description thereof when read in conjunction with the drawings in which:

FIG. 8a shows the multi-lane logic diagram for preventing activation of the camera when the speed of a car is below a predetermined value;

FIG. 12 shows how FIGS. 10 and 11 fit together;

The specification will be organized in accordance with the following outline.

Figure 14:
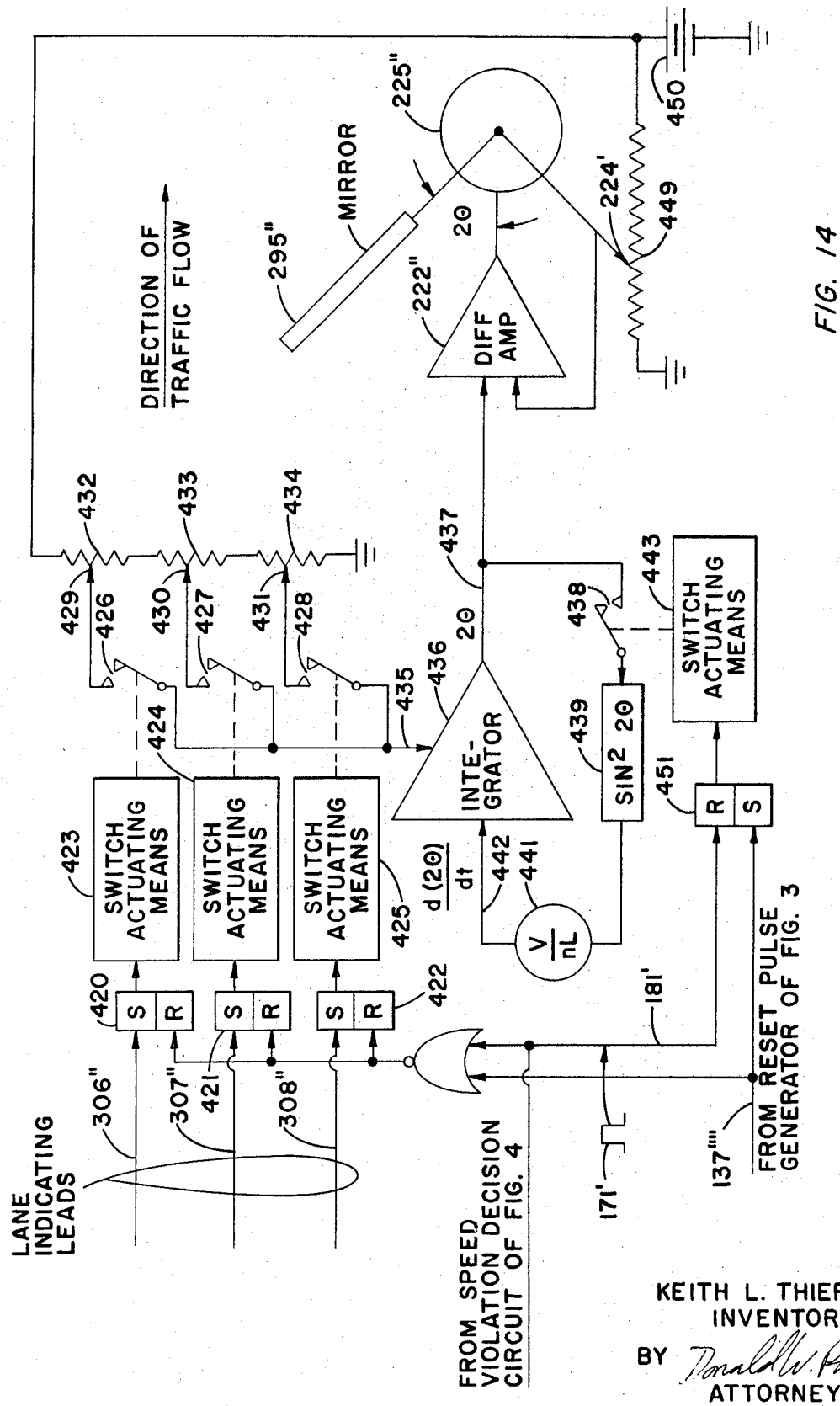
FIG. 14 is another diagram for optically tracking the speeding vehicle in accordance with computed speed and the lane in which it is traveling, but in a more precise manner than that shown in FIG. 13.
Figure 15:
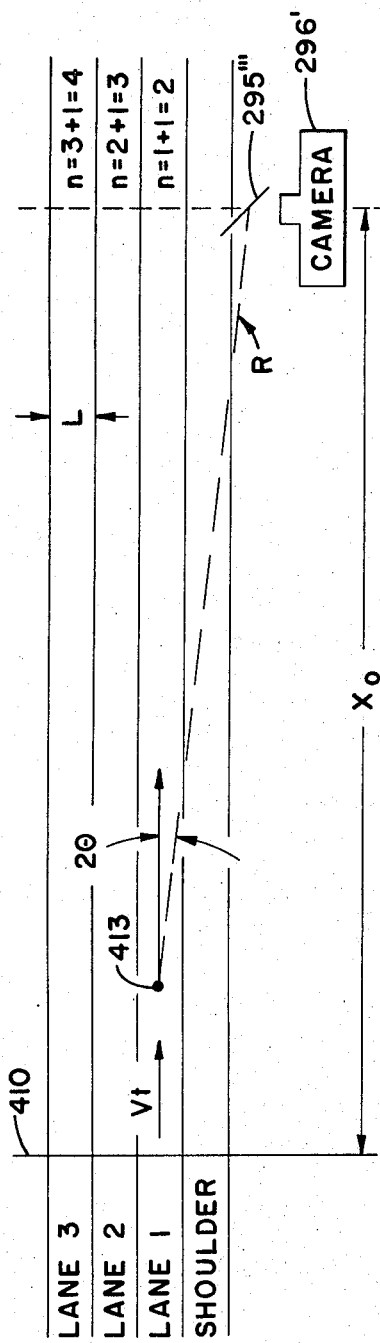
FIG. 15 is a chart showing the physical representations of the mathematical terms employed in FIG. 14.

I. GENERAL DESCRIPTION OF SINGLE LANE MODE
 A. General System (FIG. 1)
 B. Speed Computing Logic (FIG. 2)
 C. Picture Taking Decision Logic (FIGS. 3 and 4)
 D. Camera Tracking Means (FIG. 4)
 E. Slow Moving Car Detecting Logic (FIG. 6)
II. OPERATION OF SINGLE LANE MODE
 A. General System Operation (FIG. 1)
 B. Speed Computing Logic (FIG. 2)
 C. Picture Taking Decision Logic (FIGS. 3 and 4)
 D. Camera Tracking Means (FIG. 5)
 E. Slow Car Detecting Means (FIG. 6 and 6a)
III. GENERAL DISCUSSION OF MULTI-LANE MODE
 A. General System (FIGS. 7 and 8)
  1. NOR Gate Logic Flip-Flop (FIGS. 10 and 11)
 B. Multi-Lane Logic for Approximate Tracking (FIG. 13)
 C. Multi-Lane Logic for Precise Tracking (FIGS. 14 and 15)
IV. OPERATION OF MULTI-LANE MODE
 A. General System (FIGS. 7, 8 and 8a)
  1. NOR Gate Logic Flip-flop (FIGS. 10 and 11)
 B. Multi-Lane Logic for Approximate Tracking (FIG. 13)
 C. Multi-Lane Logic for Precise Tracking (FIGS. 14 and 15)

It can be seen from the foregoing outline that a general description of the single lane mode of the invention will be set forth first, followed by a discussion of the operation of such single lane mode.

Subsequently the multi-lane mode will be discussed generally, followed by a discussion of the operation thereof.

I. GENERAL DESCRIPTION OF SINGLE LANE MODE

A. General System (FIG. 1)

Figure 1:
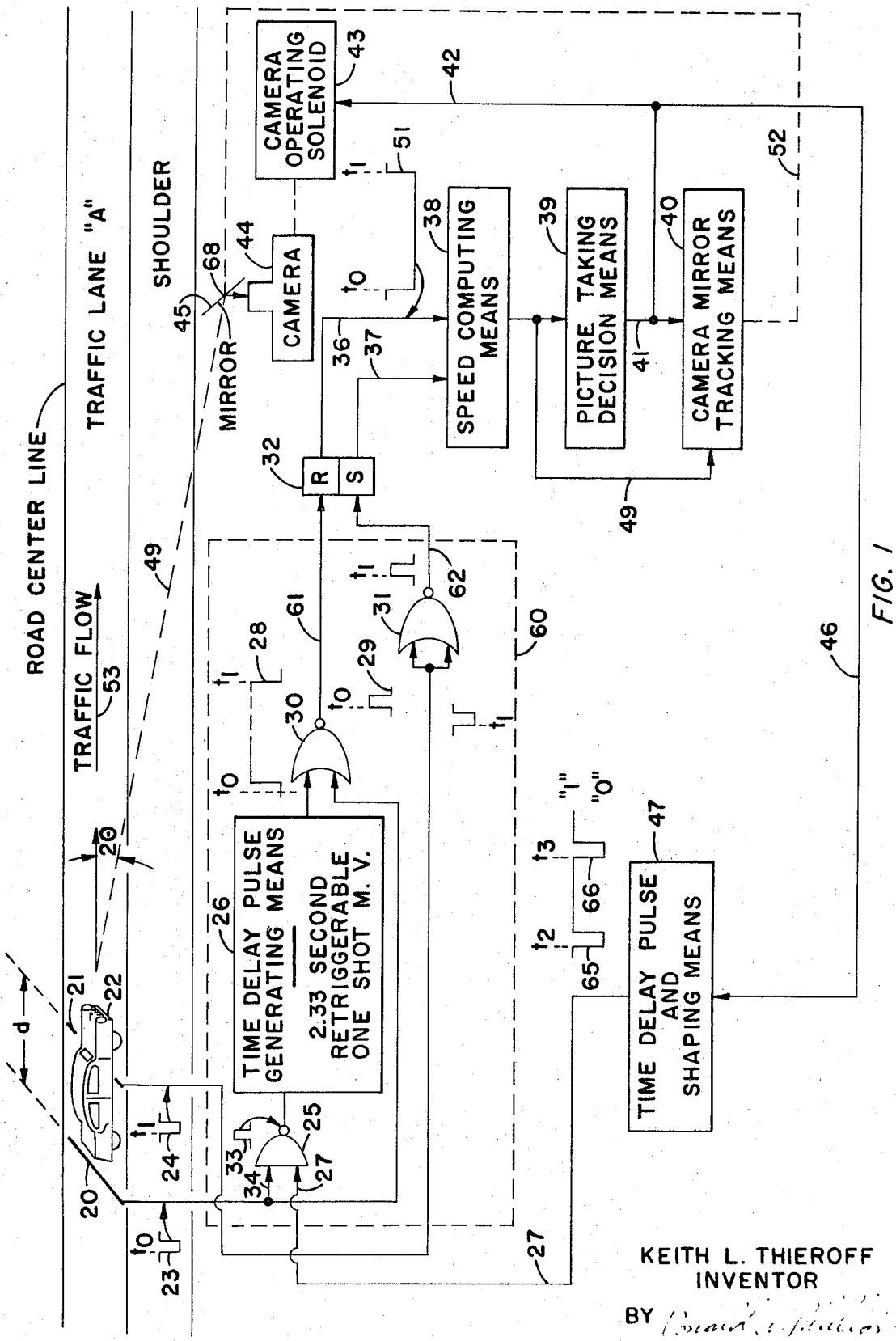
FIG. 1 is a general logic diagram of a single lane mode of the invention.

Referring now to the single lane mode of the invention shown in FIG. 1 a car 22 is shown in a position wherein both its front and rear wheels have passed over the start sensor 20 and only the front wheels have passed over the stop sensor 21.

Each time a pair of wheels passes over either the start sensor 20 or the stop sensor 21 a pulse is generated in the sensor. More specifically a pulse, such as pulse 23, is generated each time a pair of wheels passes over start sensor 20, and a pulse 24 is generated each time a pair of wheels passes over stop sensor 21.

It is to be noted that throughout the specification, pulses will be designated as having an upper or lower level, with the upper level representing a binary one condition and the lower level representing a binary zero condition.

As will be seen later the logic is so designed that only the pulses generated by the passage of the front wheels over the start and stop sensors are utilized in computing the speed of the vehicle. The pulses generated by the rear wheels are ignored by the logic of the system.

In order to compute velocity, the time t required for the front wheels of a vehicle to pass between the start sensor 20 and the stop sensor 21 is measured. Since the distance d between the sensors 20 and 21 is known, the velocity can be obtained by dividing said distance $d$ by the measured time $t$.

The start and stop pulses 23 and 24 are supplied to the logic within the dotted block 60 which has two outputs 61 and 62 leading to the reset and the set inputs respectively of flip-flop 32.

The primary function of the logic within dotted block 60 is to ensure that only those start and stop pulses generated by the front wheels of the vehicle are employed in determining the velocity of the vehicle. The function of each of the logic elements within the block 60 will be more fully understood from the detailed discussion of the operation of the circuit which will be set forth later herein under sections II – A and II – B.

The flip-flop circuit 32 is reset by the start pulse 23, through NOR gate 30, and set by the stop pulse 24, so that the output signals on its two output leads 36 and 37 constitute a measure of the time interval that the front wheels of the car 22 are in the speed zone between the start and stop sensors. Such time interval is indicated generally by waveform 51, which represents the output of terminal 36 of flip-flop 32, and can be seen to begin at time $t_o$ and terminate at time $t_1$.

A speed computing means 38 functions to produce an output signal which is directly representative of the speed of the vehicle. In the particular embodiment of the invention shown and described in this specification the speed computing means 38 is digital in nature and supplies a burst of output pulses immediately following and proportional to the time interval $t_o - t_1$ of waveform 51. The number of such pulses in said burst is a direct representation of the speed of the vehicle.

Should the speed of the vehicle constitute a speed violation, a picture taking decision means 39 is energized which produces a signal on its output terminal 41.

Such output signal on terminal 41 performs two functions. Firstly, a camera operating solenoid 43 is responsive thereto to cause the operation of camera 44. Secondly, such signal is supplied to camera mirror tracking means 40 which is constructed to also respond to the computed velocity of the vehicle via lead 49 to cause the mirror 45 to optically track the vehicle. A mechanical linkage 52 is supplied between the camera mirror tracking means 40 and the mirror 45 to enable such tracking.

More specifically, once it has been determined that the speed of the vehicle 22 is a violation, the mirror 45 is caused to pivot about it axis 68 to project the image of the car 22 into the field of view of camera 44. The rate of pivoting of the mirror 45 is determined by the speed of the vehicle.

It is to be noted that the mirror 45 is employed for the optical tracking function rather than pivoting the camera 44 since the mass of the mirror 45 is much less than that of the camera 44. Such difference in mass between mirror 45 and camera 44 is important for at least two reasons. Firstly, the size of the motor required to drive the camera 44 would be much greater than that required to drive the much lighter mirror 45. Secondly, the rate of angular acceleration of the mirror to its tracking speed must be a very large since the camera is operated only a few milliseconds after tracking commences. It is apparent that a considerably longer interval time would be required to accelerate the heavier camera 44 to the proper tracking rate.

In the event that the car 22 is not violating a speed regulation it will not be necessary either for the camera to track the vehicle or to take a picture thereof. In such an event the cycle of operation is complete when the computation of speed is made.

More specifically the cycle becomes complete at the termination of the pulse generated by pulse generator 26 within logic block 60. Said time delay pulse in effect determined a minimum cycling time of 2.33 seconds which is a sufficient time interval for the car to traverse between the start and stop sensors 20 and 21 and for the computation of the velocity, and for the determination that no violation has occurred so that no camera operation is required.

If on the other hand the car is violating a speed law then it is necessary for the camera to optically track the vehicle and take a picture thereof. After the picture is taken an additional amount of time is required for a capacitor means to charge in order to be ready to activate the flash unit in the camera during the next cycle of operation.

The pulse generating means 47 functions to provide the additional time interval needed in the event a picture is taken. It can be seen that the pulse generating and shaping means 47 is energized by the output signal from the picture taking decision means 39 to produce an output signal consisting of the two pulses 65 and 66, whose leading edges are spaced 1.4 seconds apart. Such output pulses 65 and 66 are supplied to time delay pulse generating means 26 to extend the cycling time of the system.

It is to be noted that camera 44 and its associated mirror 68 are located well off traffic lane A along which the car 22 is traveling. In fact the camera and the mirror are both located off the shoulder of the road. Thus, the angle between the line of sight 49 of the camera to the car 22 and the direction of the car forms an angle $2\theta$. Consequently, there will be a component of velocity of the car which is normal to said line of sight 49. Such normal component of velocity will, unless compensated for, cause a blurred picture of the car. It will also be apparent that such normal component of velocity of the car will increase as the car approaches the camera.

With a sufficiently fast camera and film, and proper lighting, it is possible to obtain a good picture of the car and the driver shortly after the front wheels of the car pass the stop sensor 21, with image motion compensation being based solely upon the velocity of the car at the time the front wheels pass the stop sensor 21. The subsequent, changing normal velocity component of the car with respect to the line of sight 49 can be ignored.

In other cases, where the picture of the car is taken a greater distance down the road, i.e., a longer time interval of time after the front wheels have passed stop sensor 21, a more precise tracking means is needed to provide effective image motion compensation. Such a more precise means of tracking the automobile is shown in FIGS. 14 and 15 which will be discussed in more detail later in connection with the multi-lane mode of the invention.

I. B. Speed Computing Logic (FIG. 2)

Figure 2:
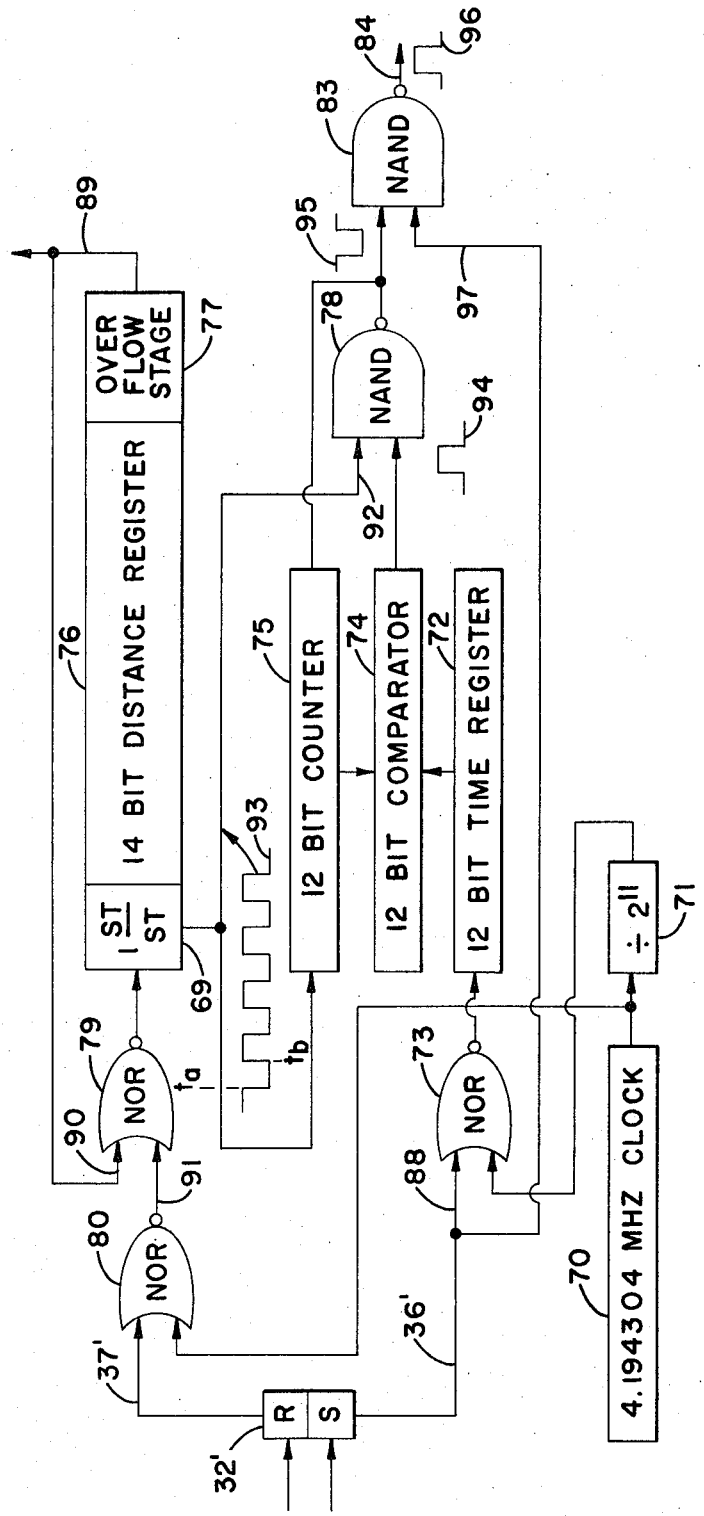
FIG. 2 is a logic diagram of the logic for computing the speed of a monitored vehicle.

A logic diagram of the speed computing logic is shown in FIG. 2 and is comprised of a 4.194304 MHZ clock pulse source 70 which supplies its output pulses to a $2^{11}$ divider 71, the output of which is a 2048 HZ pulse rate signal.

Upon energization of the start sensor 20 (FIG. 1) NOR gate 73 is opened and a 12 bit time measuring register 72 (FIG. 2) functions to receive the 2048 HZ output from divider 71 and will receive such pulses until the stop sensor 21 of FIG. 1 is energized. Thus, the 12 bit time register 72 registers a count which is directly proportional to the time the front wheels of the vehicle are in the speed zone between the start and stop sensors.

A second register 76, designated as the distance register, functions to receive the 4.19 MHZ signal from clock pulse source 70 after the stop pulse has energized and will continue to receive said 4.19 MHZ signal until register 76 becomes full. The output of the last stage of register 76, designated as overflow stage 77 is fed back to the input of register 76 through NOR gate 90 which becomes non-conductive in response to said fed back signal to terminate the reception of pulses from clock source 70. A 12 bit counter 75 also receives the output of the 4.19 MHZ clock pulse source through the first stage of counter register 76, which thereby divides the 4.19 MHZ clock pulse source by a factor of 2 for reasons that will be discussed later.

A 12 bit comparator 74 functions to compare the counts contained in registers 72 and 75 and when such counts coincide, will produce an output pulse 94. Such output pulse 94 is supplied to an output terminal 84 through NAND gates 78 and 83, and is also used to reset 12 bit counter 75 from the output of NAND gate 78.

The above-described process of comparing the contents of registers 75 and 72 continues until the flow of clock pulses to distance register 76 fills said distance register. Thus, in effect, the total number of pulses supplied to distance register 76 is divided by the count contained in register 72 and is in fact a division of distance $d$ by time $t$ to produce a velocity representing signal in the form of the number of output pulses from comparator 74.

The function of NOR gates 80, 79, and 73 and the NAND gates 78 and 83 will become more fully understood from a detailed description of the operation of the computing logic of FIG. 2 which will be described later in section II. – B.

I. C. Picture Taking Decision Logic (FIG. 3)

Figure 3:
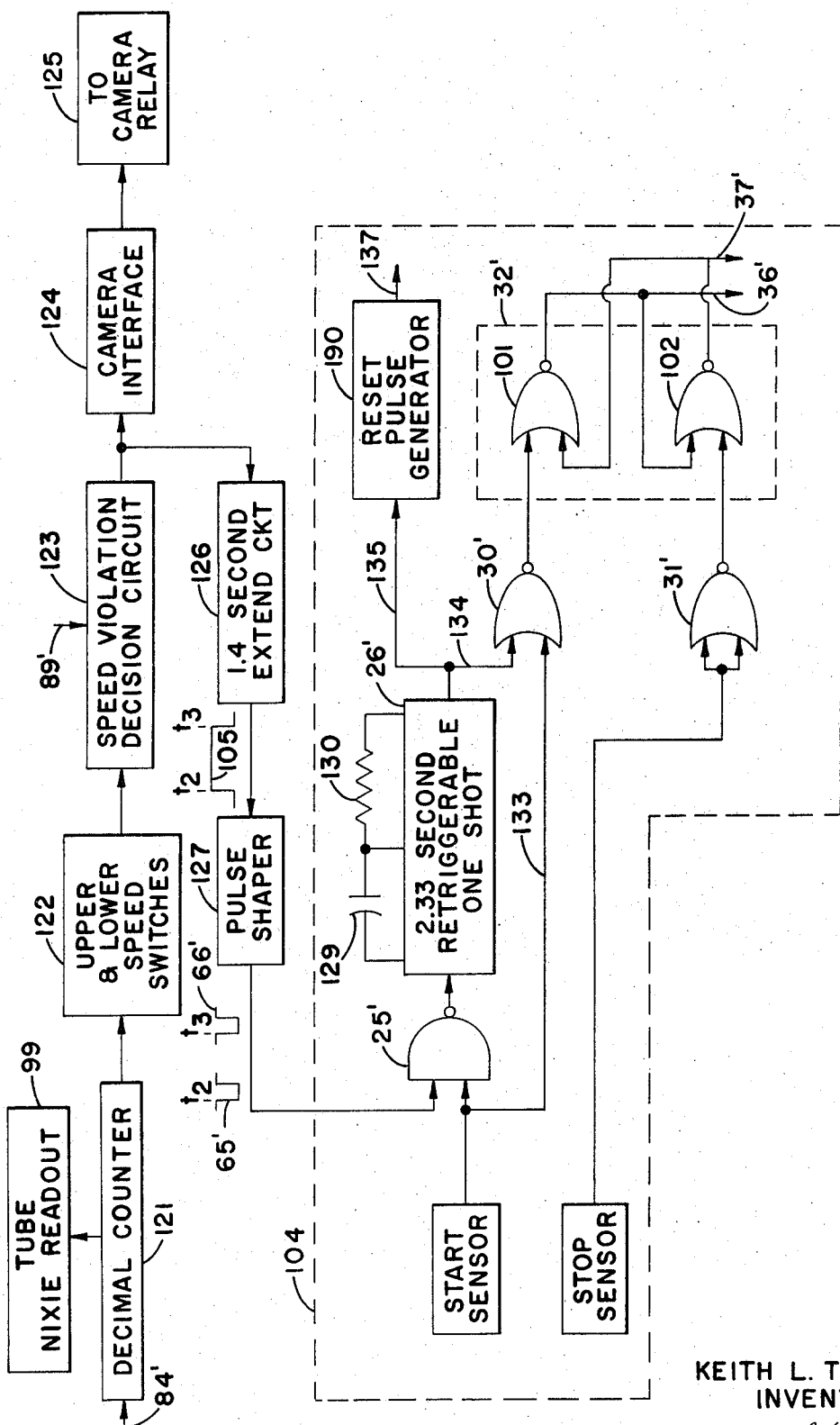
FIG. 3 is a diagram of the logic for determining whether the computed speed constitutes a violation and consequently whether a picture should be taken of the vehicle, and also includes logic means for providing a time delay to permit such picture taking.

Referring now to FIG. 3 the decimal counter 121 can be any one of several available decimal counters and functions simply to count the number of pulses supplied from the output of the 12 bit comparator 74 of FIG. 2. In a preferred embodiment of the invention the number of pulses from the comparator 74 is made equal to the speed of the vehicle in miles per hour. Thus 80 pulses from the comparator 74 represents a speed of 80 miles per hour. Such pulses are counted in decimal counter 121.

The upper and lower speed switches unit 122 is a logic circuit designed to produce output signals when the speed of the vehicle lies within certain ranges, as for example, below a minimum value which is a violation of the speed limit, and above a certain maximum value which is also a violation of the allowable speed.

A speed violation decision circuit 123 functions in effect, to read the condition of the upper and lower speed switches 123 at the completion of the velocity computation.

If the computed velocity lies in a prohibited zone then an output signal is supplied from decision circuit 123 to a camera interface 124, and thence to a camera relay 125.

The time delay pulse generating means 26' also responds to the output of the decision circuit to ensure that the cycle time is extended a sufficient amount of time (3.73 seconds) to enable the capacitors (not shown) associated with the camera flash unit (also not shown) to become recharged for the camera operation.

The remainder of the logic within block 104 is the same as that within block 60 of FIG. 1 and will not be generally described herein. A more detailed description of the operation thereof, however, will be given later in section II – C.

Figure 4:
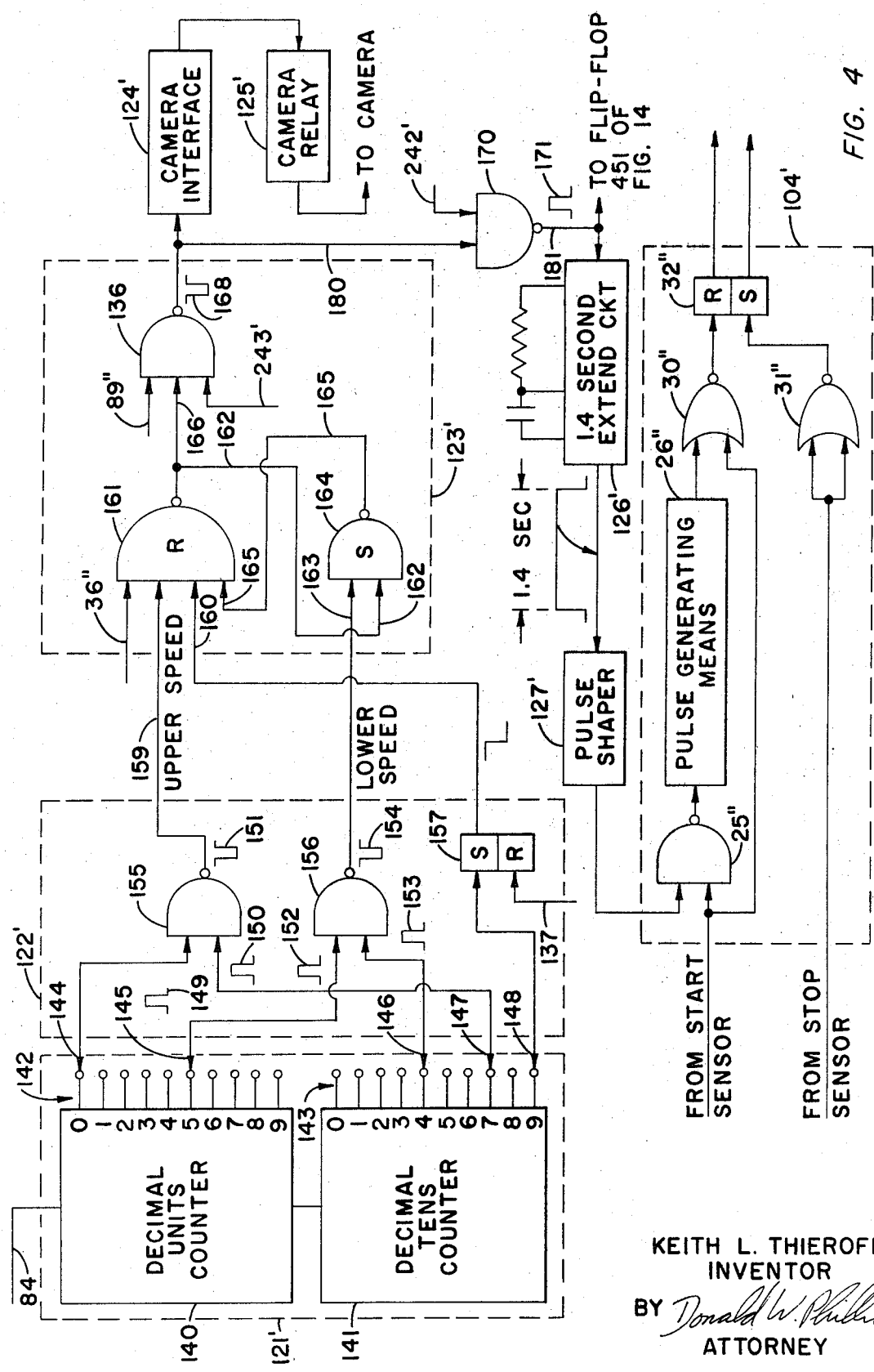
FIG. 4 is a more detailed logic diagram of the structure of FIG. 3.

In FIG. 4 there is shown more detailed logic of the decimal counter 121, the speed switches 122, and the speed violation decision circuit 123 of FIG. 3.

More specifically in FIG. 4 the decimal counter 121' is shown as consisting of a decimal unit counter 140 having its output supplied to a decimal tens counter 141. Both the decimal units counter 140 and the decimal tens counter 141 each have ten output leads 142 and 143 which represent counts of 0 to 9, for units and for tens.

Within the block 122' there is provided a pair of NAND gates 155 and 156 whose inputs are connected to the proper outputs of the decimal units and decimal tens counters 140 and 141 to indicate a minimum and a maximum speed limit.

Within the dotted block 123' there are shown the NAND gates required to make the decision as to whether a speed violation has occurred. More specifically the NAND gates 161 and 164 form a two input flip-flop circuit which responds to the outputs of NAND gates 155 and 156 to assume one of two possible stable states.

As will be discussed in the detailed operation of the logic of FIG. 4 the flip-flop within the block 123' is in a reset condition when a speed violation occurs, either below an allowed minimum speed or above an allowed maximum speed.

The NAND gate 136 functions to read the condition of the output of NAND gate 161 at the completion of the speed computation, and to produce an output signal 168 if a speed violation has occurred. The output pulse 168 is supplied through NAND gate 170 into the time delay extend circuit 126' in the manner discussed in connection with FIG. 3.

NAND gate 170 has a second input lead 242', which receives input signals in the case of cars going at very low rates of speed, e.g., less than 3 miles per hour. As will be seen later the time delay pulse generated by generating means 126' is utilized under such conditions to prevent the taking of a picture of such cars.

I. D. Camera Tracking Means (FIG. 5)

Figure 5:
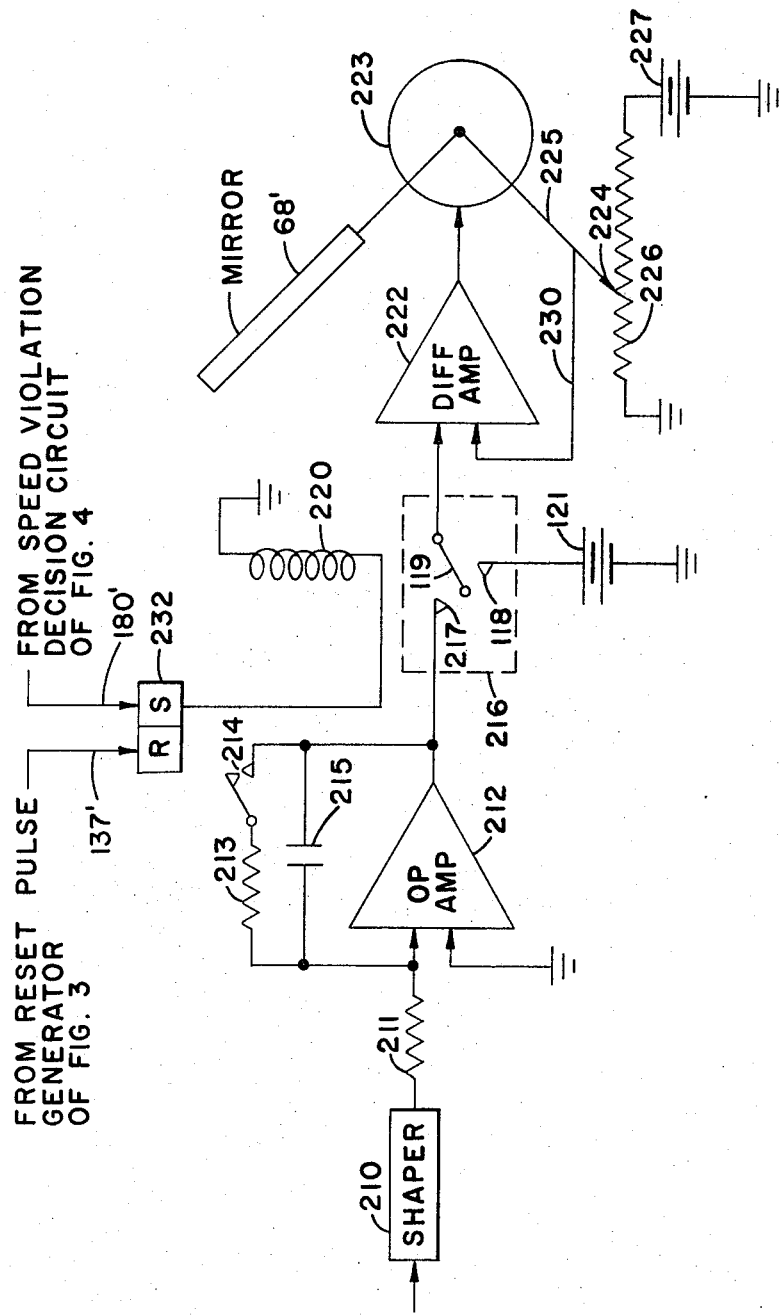
FIG. 5 is a combination logic and schematic diagram of a structure for enabling the camera to optically track a moving vehicle in accordance with its velocity, in the single lane mode of the device.

The basic functions of the circuit of FIG. 5 are twofold. Firstly, the circuit must produce a signal whose magnitude is proportional to the velocity of the car at the time the front wheels pass over the stop switch 21 (FIG. 1) so that the rate of tracking can be in accordance with such velocity. Secondly, the circuit must respond to the determination as to whether the vehicle is in fact violating a speed limit as determined by the logic of FIG. 3. If such a violation does exist then the velocity-proportional voltage signal developed is supplied to servo motor 223 to cause tracking to occur.

On the other hand if the vehicle does not constitute a speed violation then tracking is not required and the velocity-proportional voltage signal is not supplied to servo motor 223.

The shaper 21 can be a conventional circuit which receives the pulses representing speed, and shapes such pulses into ones of uniform width and height. An operational amplifier 212, which also can be a conventional circuit, functions to produce an output voltage proportional to the number of input pulses supplied thereto, and therefore is the velocity-proportional voltage signal mentioned above.

If the vehicle is violating the speed limit a switch 216 is closed to pass the output of the operational amplifier to a conventional differential amplifier 222.

The servo motor 223 is responsive to the output of differential amplifier 222 to rotate until a movable tap 224 rotates to a position of rheostat 226 whereby a null output from differential amplifier 222 is obtained.

A mirror 68' rotates with servo motor 223 to perform the optical tracking function. The mirror 68' corresponds to the mirror 68 of FIG. 1.

The switch 216, although shown as an electromagnetic type switch activated by a relay winding 220, can also be any one of many types of well known electronics switches.

A flip-flop circuit 232 is caused to be set by the output of the speed violation decision circuit 123 of FIG. 3 to activate the switch 216 and cause tracking to commence.

I. E. Slow Moving Car Detecting Logic (FIG. 6)

Under certain conditions it is possible for a car to be moving so slowly that the front wheels will pass over and actuate the start sensor and then, before said front wheels can reach the stop sensor and while the car is still straddling the start sensor, the time delay pulse generating means will expire. Subsequently the rear wheels will reactivate the system so that velocity computation will be measured from the time the start sensor is actuated by the rear wheels of the car.

Such a contingency is most likely to happen on a crowded highway or freeway where traffic has slowed down to a 2 or 3-mile-per-hour rate or less, such as sometimes happens when an accident has occurred or during very heavy rush hour traffic.

Figure 6:
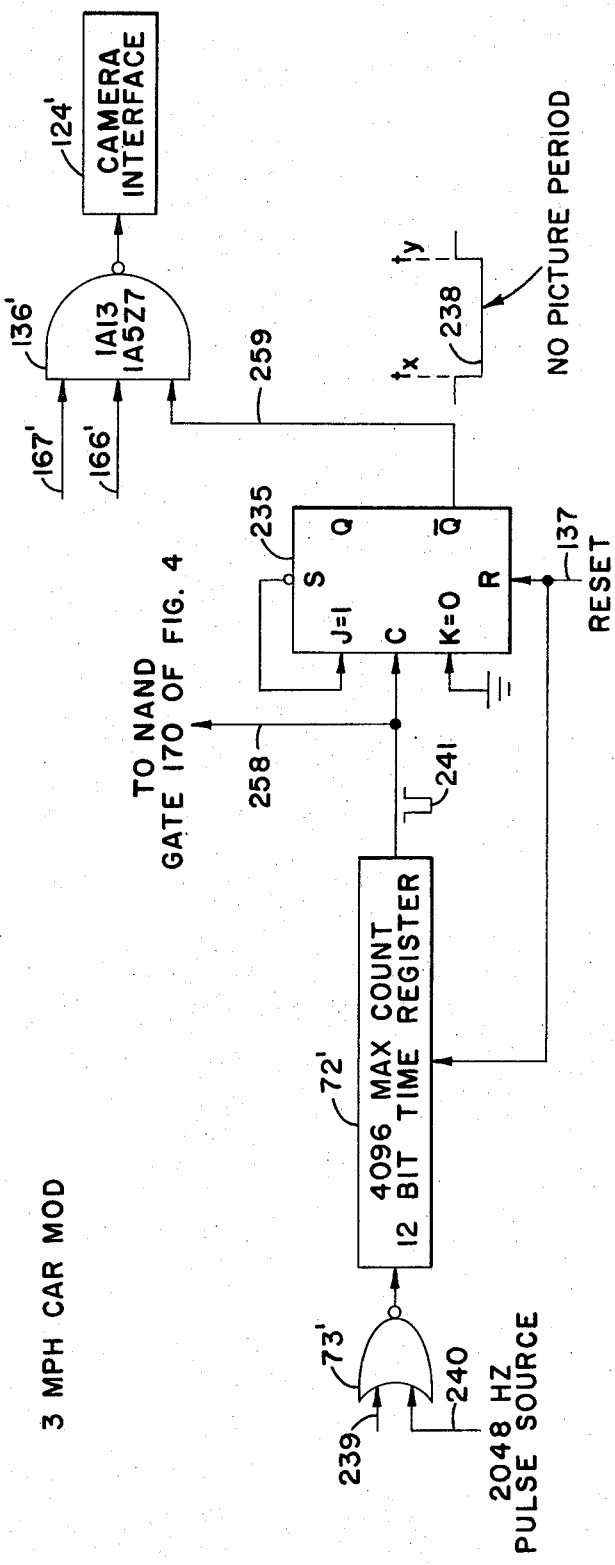
FIG. 6 is a diagram of the logic for preventing activation of the camera when the speed of the vehicle is below a predetermined minimum value.

To avoid such possible false velocity computation, there is provided the logic of FIG. 6. In FIG. 6 the 12 bit register 72' corresponds to the 12 bit register 72 of FIG. 2. The NAND gate 136' corresponds to the NAND gate 136 of FIG. 4 which, when in a nonconductive state, prevents a signal from being supplied to the camera relay 125' to activate the camera (not shown).

A flip-flop circuit 235 can be a J-K flip-flop constructed to respond to the overflow of the 12 bit time register 72' to product an output signal on its $\bar{Q}$ output lead, thereby disabling NAND gate 136' to prevent actuation of the camera.

It is to be noted that the overflow condition of 12 bit time register 72' can occur only when a relatively long time occurs between actuation of the start sensor 20 and the stop sensor 21 of FIG. 1. Such a long time interval occurs under the conditions of a very slow moving car as discussed above.

II. OPERATION OF SINGLE LAND MODE SYSTEM

A. General System (FIG. 1)

In FIG. 1 the car 22 is shown as having had its front wheels pass over both the start sensor 20 and the stop sensor 21 to generate pulses 23 and 24, respectively, at times $t_o$ and $t_1$.

It will be recalled that in this specification the upper level of pulses represent binary "1's" and the lower levels represents binary "0's."

Thus, since the input lead 27 to NAND gate 25 is at an upper level or a 1 condition at the time the negative pulse 23 is supplied to the other input lead 34 thereof, the output of NAND gate 25 will be a positive pulse 33, as shown in FIG. 1. Such positive pulse is supplied to the time delay pulse generating means 26 to initiate a 2.33 second pulse 28. More specifically, the output of the time delay pulse generating means 26 will change from a lower level to an upper level condition and will remain in said upper level for a 2.33 second time interval, and which time it will return to the lower level.

Due to an inherent time delay in changing levels in pulse generating means 26, however, the start pulse 23 will be supplied to the NOR gate 30 a short time interval before the output of the pulse generating means 26 changes from its lower to its upper level. Thus, there will be a short interval of time when both inputs to the NOR gate 30 will be zeros, thereby producing a positive output pulse 29, as shown in FIG. 1, on its output lead 61. Such positive pulses 29, sometimes referred to herein, and in the claims, as a computation initiating signal, will function to reset flip-flop 32, and thus produce a change in state on said output lead 36 of flip-flop 32. Such change in state is from an upper to a lower level, as indicated by the waveform 51 of FIG. 1 and commences at time $t_o$.

It is noted that once the output of pulse generating means 26 has assumed its high level condition, further actuations of the start sensor 20 will produce no further output pulse from NOR gate 30. The high level input supplied to NOR gate 30 from pulse generating means 26 will ensure that the output of NOR gate 30 will remain at a low level, regardless of what input is supplied to the other input terminal thereof.

The one exception to the foregoing generality is the case where the car 22 is going so slowly that the 2.33 second delay pulse expires during the time that the front wheels are passing between the start sensor 20 and the stop sensors 21. To cause such an occurrence it would be necessary that the car be going less than 4 mph, since the distance $d$ between the start and stop sensors 20 and 21 is 11.733 feet. Should such an event occur, the rear wheels of the vehicle would actuate the start sensor 20 and would re-energize the time delay pulse generating means 26. Then subsequently, the front wheels could activate the stop sensor 21 to provide a very high, but very inaccurate indication of speed.

To prevent the foregoing, there is provided, as mentioned briefly above, logic means as shown in FIG. 5 which will be described later in more detail in section II – E.

At time $t_o$, when the waveform 51 changes from its high to its low level, the speed computing means 38 begins its function of computing speed. Actually, at this point in the operation, the speed computing means 38 will begin to measure the time required for the front wheels of the car to pass between sensors 20 and 21.

When the front wheels of the car pass stop sensor 21, the pulse 24 is supplied through inverter 31 to set flip-flop 32, thereby changing the level of the output signal on terminal 36 back to its upper level, as shown at time $t_1$ in waveform 51.

Utilizing the measured time t and the distance $d$ between the start and stop sensors 20 and 21 the speed computing means 38 next functions to compute the speed of the vehicle. In one particular form of speed computing means the speed representing signal consists of a burst of pulses, the number of which represents the speed in miles per hour. Thus, for example, a burst of 80 pulses supplied from the speed computing means 38 to the picture taking decision means 39 is a direct representation of a speed of 80 miles per hour.

Assuming the speed limit to be 70 MPH the picture taking decision means 39 will determine that the 80 MPH speed of the vehicle is a violation and will produce an output signal on its output terminal 41. Such output signal will be supplied to the camera mirror tracking means 40 and also to a camera operating solenoid 43.

Also supplied to the camera mirror tracking means 40 is the burst of 80 pulses from the speed computing means 38 via lead 49. Appropriate integrating means are including in the tracking means 40 which response to the 80 pulses supplied thereto to produce a voltage signal whose amplitude is proportional to the number of pulses supplied thereto and thus to the velocity of the vehicle. Such voltage signal is then supplied to a servo motor (not shown in FIG. 1) which functions to cause the camera mirror 68 to optically track the vehicle 22 at a rate in accordance with the magnitude of said voltage signal supplied thereto, and thus in accordance with the speed of car 22.

As will be discussed in more detail later herein, the system is designed so that the camera mirror tracking means 40 begins tracking the car a short interval of time before the camera operating solenoid 43 functions to actuate the camera 44.

The tracking means 40 comprises a servo motor (not shown in FIG. 1) which drives the mirror 68 through a suitable mechanical linkage 52. The mirror 68 is thus caused to rotate such that the line of sight 49 tracks substantially vehicle 22. Immediately after tracking is initiated the solenoid 43 actuates the camera 44 to take a picture of car 22. At the time the picture is taken the front wheels of car 22 have passed only a few feet beyond stop sensor 21, even at speeds of 60 or 70 MPH.

When a picture is taken of the car an additional time interval is required to permit the flash unit (not shown) associated with the camera 44 to become conditioned to take another picture. Specifically such conditioning of the flash unit usually involves the recharging of a capacitor (not shown) which is employed in operating the flash unit.

Such additional time interval is obtained by supplying the output of picture taking decision means 39 to pulse generating and shaping means 47. Such pulse generating and shaping means 47 functions to produce a pair of output pulses 65 and 66 each beginning at a time designated as $t_2$ and $t_3$, respectively.

The first occurring of these pulses, pulse 65, beginning at time $t_2$, must be generated sometime during the initial 2.33 seconds time delay pulse generated by pulse generating means 26 so that the cycle is not interrupted.

Such pulse 65 is supplied through NAND gate 25 to cause time delay pulse generating means 26 to generate another 2.33 second time delay pulse. The time interval $t_2 - t_3$ is caused to be 1.4 seconds in duration. Thus the second pulse 66 generated by pulse shaping means 47 is supplied to pulse generating means 26 before expiration of the newly generated 2.33 delaypulse and causes a third 2.33 seconds time delaypulse to be generated at the output of delay pulse generating means 26.

Thus the total effect of the output from the pulse generating and shaping means 47 is to extend the cycling time 3.15 seconds, measured from time $t_2$, (1.4 + 2.33 = 3.73). It has been determined that a time interval of 3.73 seconds is sufficient for the entire system to recover and to prepare the camera to take another picture.

It is to be specifically noted that the pulse 65, which is generated at time $t_2$ must occur before the expiration of the original 2.33 seconds delay pulse generated by the front wheels of the car passing over start switch 20. If such were not the case and if the pulse 65 were generated after the expiration of such original 2.33 microsecond pulse, then the rear wheels of car 22, or conceivably even a pair of wheels on another car, could actuate start sensor 20 and cause another cycle to commence before the camera was conditioned to take another picture. To avoid such an undesirable possibility the pulse 65 is caused to occur before the expiration of the originally generated 2.33 seconds delay pulse.

The camera 44 can be any one of several high quality, high speed cameras available on the market. The flash unit (not shown) has been found to be most effective if some of the radiation therefrom lies in the infrared spectrum. The use of infra-red in the light spectrum of the flash unit enables a clearer picture of the driver to be obtained. Experiments have shown that the visible spectrum, when used alone, does not produce sufficient reflection from the driver's face.

II. B. Speed Computing Logic (FIG. 2)

The speed computing means 38 of FIG. 1 is shown in more detail in FIG. 2. In FIG. 2 NOR gate 73 is responsive to the resetting of flip-flop 32 of FIG. 1 to become conditioned to permit clock pulses to flow from source 70, through $2^{11}$ dividing means 71, and into 12 bit time register 72.

More specifically the 4.19 MHZ clock pulses from source 70 are supplied through divider 71 where they are divided by a factor of $2^{11}$ to produce a clock pulse rate of 2048 HZ, which is then supplied through NOR gate 73 to counter register 72.

Such 2048 HZ clock pulses are supplied to register 72 until the stop sensor 21 of FIG. 1 is activated by the front wheels of car 22. When stop sensor 21 is so actuated, flip-flop 32 of FIG. 1 will be changed to a set condition and NOR gate 73 of FIG. 2 will be closed, thus blocking further pulses from being supplied to register 72.

Also at this time NOR gate 80 will be changed from a non-conductive to a conductive state by virtue of the set condition of flip-flop 32'. More specifically the output terminal 37 of flip-flop 32' is connected to NOR gate 80 and when the signal level on said output lead 37" changes from a high to a low level, as it does at time $t_1$, the NOR gate 80 will become conditioned to pass pulses from clock pulse 70 therethrough.

Thus the 4.19 MHZ clock pulses signal from source 70 will pass through NOR gate 80 and then through NOR gate 79 into the 14 bit distance register 76.

It is to be noted that NOR gate 79 will conduct such pulses since its other input lead 90 has a 0 thereon by virtue of the fact that the last stage of distance counter 76, which is designated as overflow stage 77, contains a 0.

The flow of pulses from the 4.19 MHZ clock pulse source 70 will be supplied to the 14 bit distance register 76 until the last stage, i.e., the overflow stage 77, changes from a 0 to a 1. At such time the NOR gate 79 will become non-conductive and prevent further clock pulses from being supplied therethrough.

The number of pulses that have thus been supplied to distance register 76 represents the distance d between the start and stop sensors 20 and 21 of FIG. 1.

The process of dividing the distance $d$, represented by the count in register 76, by the time $t$ represented by the count stored in timed register 72 is effected as follows. As the clock pulses are supplied into register 76 they are also supplied to 12 bit counter 75. It should be noted that actually the pulses supplied to 12 bit counter 75 are supplied thereto from the output of the first stage of distance register 76 so that in fact the pulse rate supplied to 12 bit counter 75 is one half of the 4.19 MHZ pulse rate supplied to register 76, or approximately 2.1 MHZ.

The reason for supplying the lesser clock pulse rate to 12 bit counter 75 is due primarily to the fact that the contents of counter register 75 and counter register 72 must be compared after each pulse has been entered into counter 75.

When a sufficient number of pulses have been entered into counter 75 to cause the count thereof to coincide with the count contained in register 72, the comparator 74 will detect such coincidence and supply a positive output pulse 94 to NAND gate 78.

The circuit is designed so that counter 75 changes states at the positive-to-negative transition of the pulse supplied thereto as shown at time $t_a$ in waveform 93. A half cycle later at time $t_b$ (assuming coincident counts in counters 72 and 75), when said waveform 93 goes to its positive level, the NAND gate 78 will produce a negative output pulse 95 which is supplied to NAND gate 83. Since positive level signals have been supplied to both inputs of NAND gate 83 prior to the reception of a coincidence indicating pulse 95, the output of NAND gate 83 had been at a negative level, prior to the occurrence of negative pulse 95. Upon the occurrence of negative pulse 95 a positive output pulse 96 is produced at the output of NAND gate 83.

As will be shown and discussed below in connection with FIG. 3 the positive output pulses from NAND gate 83 are supplied to the decimal counter 121 of FIG. 3.

To better understand the relation between the count contained in distance register 76 and time register 72, and also to better understand the accuracy of the system, consider the following specific example.

Assume a car is traveling at 120 miles per hour. Assume also that the sensors 20 and 21 of FIG. 1 are spaced apart a distance of 11.733 feet, plus a possible error of .025 feet. The time of travel between sensors is then:

$$(11.733+.025)(60)(60)/(120)(5280) = .0668087$$
$$\text{seconds} \qquad \text{Exp (1)}$$

During this time interval .0668087 seconds the NOR gate 73 of FIG. 2 will pass into the time register 72 the output of divider 71. Assuming a frequency error of + .005 percent, the output frequency of divider 71 is equal to 2048.1024 HZ. The number of such clock pulses supplied through NOR gate 73 into register 72 is then as follows:

$$(2048.1024)(.0668087) = 136.831 \cong 137 \quad \text{Exp (2)}$$

Thus in the worst case, 137 counts would be stored in time register 72.

At the end of the .0668087 second time interval NOR gate 73 becomes non-conductive and NOR gate 80 becomes conductive, thereby permitting the 4.19 MHZ clock pulse flow into 14 bit distance register 76. When the first stage 69 is included, the distance register 76 actually has 15 stages and a count capacity of $2^{15}$. The computation time is then as follows:

$$2^{15}/2^{22} = 2^{-7} = 7.8 \text{ milliseconds}$$

$$\text{where } 2^{22} = 4.194 \times 10^6 \qquad \text{Exp (3)}$$

The foregoing calculation of time is constant regardless of the speed of the vehicle being monitored.

In the example assumed, i.e., where the car has a velocity of 120 MPH the time register 72 contains a count of 137. As the distance register 76 counts up to its maximum capacity; the counter 75 will also count up, but at a rate half that of register 76 since the pulse train supplied to counter 75 is from the output of the first stage of register 76 and is, in effect, divided by 2. When the count of register 75 reaches 137 compare circuit 74 will produce an output pulse and reset counter 75 to zero. The foregoing cycle is repeated V times, as follows, to produce V output pulses which represent the velocity of the car:

$$V = 2^{14}/137 = 16384/137 = 119 + 81/137 \cong 119 \text{ MPH}$$
$$\text{Exp (4)}$$

It should be noted that only the counter register 75 is reset during this division process. The distance register 76 is not reset. On the contrary the distance register 76 counts to its capacity of $2^{14}$, and then at the next clock pulse the overflow bit in the last stage 77 changes to a 1, closing NOR gate 79 and blocking any further flow of clock pulses into distance register 76.

II. C. Picture Taking Decision Logic (FIGS. 3 and 4)

The 119 reset pulses which appear at the output of NAND gate 78 of FIG. 2 are supplied to NAND gate 83 and appear at the output thereof as positive pulses 96. Said positive pulses are then supplied to the decimal counter 121 of FIG. 3 where they function to operate suitable visual output means 99, such as the NIXIE tubes manufactured by the Burroughs Corp. It is to be noted that the 119 pulses constitute a direct reading of the 120 miles per hour speed of the car, and with the maximum error being present. Said maximum error is 1 mile per hour at the 120 mile per hour rate.

As the decade counter 121 counts up from zero to 119, it will pass through counts corresponding to the minimum and maximum speed settings of the switches 122, which settings are manually controllable by an operator.

As discussed briefly in section I – C many highways today have a lower speed limit as well as an upper speed limit. Accordingly the upper and lower speed switch logic 122 is designed to accomodate both limits.

At the termination of the train of pulses supplied to decimal counter 121 which, by definition, is the termination of the speed computation function, a speed violation decision circuit 123 is responsive to the computed speed to provide an output signal indicative of whether such computed speed lies within or without the illegal speed ranges.

More specifically, when distance register 76 of FIG. 2 overflows, marking the end of the speed computation period, a pulse is supplied from the overflow stage 77 to the speed violation decision circuit 123 of FIG. 3 via lead 89'. It is at this time that said speed violation decision circuit 123 examines the computed velocity of the car and determines whether such speed constitutes a violation.

If no violation has occurred there will be no output from decision circuit 123 and the time delay circuit 26' will be permitted to terminate at the end of the 2.33 second delay time. Certain reset functions will then occur and the system will then be ready to process the speed of another car.

On the other hand, if a speed violation has occurred, an output signal will be produced at the output of decision circuit 123. Such output signal will be supplied to a camera relay 125 via an appropriate camera interfacing circuit 124, which is essentially a power amplifier designed to produce sufficient power to operate camera relay 125.

Since the picture is taken by the camera with the aid of an electronic flash (not shown) an extended time interval is required, over and beyond the original 2.33 seconds supplied by the generating means 26', in order to permit the capacitor associated with the camera flash (also not shown) to recharge in preparation to take a picture of a subsequent vehicle.

The extension of such time delay is accomplished by means of the 1.4 second extend circuit 126 and a pulse shaper 127. The extend circuit 126 in effect generates a pulse beginning at a time substantially coincident with the leading edge of the output pulse from decision circuit 123. Such time is designated as time $t_2$ in waveform 105 of FIG. 3. Such pulse 105 terminates 1.4 seconds later at time $t_3$.

A pulse shaper 127 is constructed to respond to the leading and lagging edges of pulse 105 to produce a pair of pulses 65' and 66' which having leading edges at time $t_2$ and $t_3$, respectively.

The pulses 65' and 66' are supplied to pulse generating means 26' through NAND gate 25'. The leading edges of each of the two pulses 65' and 66' function to trigger a 2.33 delay pulse in pulse generating means 26'. It is to be noted that since the leading edge of the second pulse 66' occurs 1.4 seconds after the leading edge of pulse 65', the total delay pulse generated in pulse generating means 26' is equal to 1.4 seconds plus 2.33 seconds, or 3.73 seconds. This 3.73 seconds time interval is sufficient time to enable the capacitor associated with the camera flash to recharge to its operating value.

At the end of the 3.73 seconds time interval the output of the generating means 26' will change from its upper to its lower level. Since the other input lead 133 to NOR gate 30' is, at this time, in its upper level there will be no change in signal level at the output of NOR gate 30'. It will remain at its low level.

Also, it is to be noted that when the output of pulse generator 26' changes from its upper to its lower state the various counters in the circuit are reset to zero via lead 137, thereby preparing the entire system to detect and process another passing vehicle.

Referring now to FIG. 4 there is shown in the blocks 121', 122' and 123' a more detailed logic of blocks 121, 122, and 123 of FIG. 3.

In FIG. 4 the velocity representing pulse train is supplied via input lead 84' into decimal unit counter 140 which has 10 outputs 142 representing the counts 0 through 9 respectively.

Each time the count of the decimal units counter 140 changes from a 9 to a 0 an output is supplied to decimal tens counter 141, which also has 10 output leads 143 indicating 10's from 0 to 9.

Each of the two NAND gates 155 and 156 within the speed switch block 122' has one of its input leads connected to a slidable contact on the decimal unit counter 140 and its other input lead connected to a slidable contact on the output of the decimal ten counter 141. More specifically, slidable contacts 144 and 147 are connected to the input terminals of NAND gate 155 and slidable contacts 145 and 146 are connected to the input terminals of NAND gate 156.

An examination of FIG. 4 will show that the two slidable contacts 145 and 146 are set at a reading of 45 so that NAND gate 156 will produce an output pulse 154 when the received velocity-indicating train of pulses causes the decimal counter 121' to pass the count of 45.

Also it can be seen from the drawing that the slidable terminals 144 and 147 connected to the inputs of NAND gate 155 are set on 70. Thus when the count of decimal counter 121' passes 70, the positive pulses 149 and 150 will be supplied from adjustable taps 144 and 147 to produce the negative output pulse 151 at the output of NAND gate 155.

It is to be noted that the two output pulses 154 and 151 produced at the output of NAND gates 156 and 155 occur only during the counts 45 and 70. Once these two counts are passed the outputs of NAND gates 155 and 156 will return to their high level values.

The outputs of NAND gates 155 and 156 are supplied to two inputs of a flip-flop circuit comprised of NAND gates 161 and 164 and contained within the block 123'. It is to be noted that the speed violation decision circuit 123' is, essentially, such a flip-flop circuit and an output NAND gate 136.

By definition the flip-flop circuit in block 123' will be in a reset condition when the output of NAND gate 161 has a 1 thereon and the output of NAND gate 164 has a 0 thereon, and will be in a set condition when the output of NAND gate 161 has a 0 thereon and the output of NAND gate 164, a 1.

As will be understood more fully from a detailed description to be set forth below, the flip-flop of block 123' initially will be in a reset condition when the decimal counter 121' begins to count from zero. It will stay in such reset condition until the count of 45 is reached, at which time a pulse will be received from the output of NAND gate 156, which will cause said flip-flop circuit 123' to change to a set condition.

Said set condition will exit until the count of the decimal counter 121' reaches 70, at which time NAND gate 155 will supply an output pulse 151 to said flip-flop circuit to again cause it to assume its reset condition.

When in its reset condition, between the counts of zero and 45, and above the count of 70, a 1 will be supplied to input terminal 166 of NAND gate 136.

When the speed computation is completed a 1 will appear on input lead 89'' of NAND gate 136. If at this time a 1 also appears on lead 166 there will be produced at the output of NAND gate 136' a negative pulse 168.

Such negative pulse 168 is then supplied to camera interface 124' where it is properly amplified to the magnitude necessary to operate camera relay 125'. Said pulse 168 is also supplied to the 1.4 second extend circuit 126' which responds thereto in the manner described in connection with FIG. 3.

Consider now in more detail the operation of the flip-flop circuit comprised within block 123' and comprised of NAND gates 161 and 164. By definition a NAND gate ill have a 0 output only when all of its input leads have 1's thereon. If any one of the input leads is a 0 the output of the NAND gate will be a 1.

To ensure that NAND gate 161 has a 1 thereon at the beginning of the count in decimal counter 121' one of the inputs to said NAND gate 161 comes from the output 36 of FIG. 1. As discussed in connection with FIG. 1 the output lead 36 will be at its low level, i.e., will have a 0 thereon during the time interval between the actuation of the start and stop sensors 20 and 21 of FIG. 1. Thus by definition the output of NAND gate 161 of FIG. 4 will have a 1 on its output when stop sensor 21 is actuated. Immediately thereafter the speed computation will be made and the count in decimal counter 121' of FIG. 4 will begin.

When the count in the decimal counter reaches 45 a 0 in the form of negative pulse 154 is supplied from NAND gate 156 to input lead 163 of NAND gate 164. The output of NAND gate 164 will at that time change from a 0 to a 1. Such 1 will be supplied to input 165 of NAND gate 161 so that all four inputs to NAND gate 161 above the count of 45 (but below 70) will be 1's.

The output of NAND gate 161 will therefore be a 0 which is supplied to input 166 of NAND gate 136. Consequently if the computation of velocity should terminate at this time and a termination signal supplied to input lead 89'' of NAND gate 136, there will be no output pulse produced at the output of NAND gate 136. Accordingly camera relay 125' will not be energized and no picture of the car will be taken.

Assuming, however, that the car is going 120 miles per hour, the count in decimal counter 121' will continue beyond 45 towards 120. When the count reaches 70,1's will be supplied to the two inputs of NAND gate 155 via slidable taps 144 and 147 in the form of pulses 149 and 150. A 0 accordingly will be produced at the output of NAND gate 155, as represented by negative pulse 151 which is supplied to input lead 159 of NAND gate 161.

Since all four input leads of NAND gate 161 had 1's thereon prior to the supplying of negative pulse 151 thereto, the said pulse 151 will function to cause the output of NAND gate 161 to change from a 0 level to a 1, thereby causing the flip-flop in block 123' to change states.

More specifically the 1 appearing at the output of NAND gate 161 will be supplied to input lead 162 of NAND gate 164. Since a 1 is already present on the input of 163 of NAND gate 164 the output of said NAND gate 164 will change from a 1 level, which signal is supplied back to the input 165 of NAND gate 161, thereby maintaining the output of said NAND gate 161 at a 1 level.

Thus, above the count of 70, the NAND gate 161 will have a 1 at its output so that if the speed computation should terminate during this time, and a 1 supplied to input lead 89'' of NAND gate 136, the output of said NAND gate 136 will momentarily change from a 1 to a 0 level, as represented by the output pulse 168. Said output pulse 168 will function to operate the camera and also to activate the extend circuit 126' in the manner discussed herein before.

It can be seen from FIG. 4 that the decimal counter has a maximum capacity of 99, at which count it will recycle and begin to count again from zero. Thus if a car is actually going 110 miles per hour it would appear from the output of decimal counter 121' that the car was traveling at only 10 miles per hour. Thus, where the range of zero to 45 miles per hour is considered a violation, the device would quite properly take a picture of the vehicle even though it was mistaken as to its actual speed. In other applications, however, where there is no minimum speed limit, the decimal counter would supply a signal to the flip-flop of block 123' indicating a speed of only 10 miles per hour, even though the car were actually going 110 miles per hour. No picture would be taken and no violation recorded, even though there was in fact a violation.

To prevent such an occurrence there is provided a flip-flop 157 having its set input connected to the 9's output of the decimal 10's counter 141. Furthermore, flip-flop 157 is designed to operate on the positive to negative transition of said 9's output. Thus as said 9's output is cycling back to zero, which occurs only at the count of 99, the flip-flop 157 is set and a 0 or low level signal is supplied to the input 160 of NAND gate 161, thus ensuring that a 1 will appear on the output of NAND gate 161 for all velocities of 100 miles an hour or greater.

II. D. Camera Tracking Means (FIG. 5)

It can be seen from FIG. 1 the pulse train generated by the speed computing means 38 and representative of the speed of the car is supplied via lead 49 to a camera mirror and tracking means 40. Such camera mirror and tracking means 40 is shown in more detail in FIG. 5.

Three functions must be accomplished by the tracking means of FIG. 5. Firstly, the mirror 68' must be positioned initially so that it will provide a line of sight from the camera to a vehicle which has just passed over the stop sensor.

Secondly, the tracking means must generate a voltage proportional to the velocity of the vehicle and have such voltage ready to be supplied to the servo motor 223 to drive the mirror a short interval of time before the camera is activated.

Thirdly, the tracking means must respond to the decision as to whether the vehicle is violating the speed limit, and if a violation exists, must connect the tracking voltage to the servo motor 223 to initiate tracking of the vehicle by mirror 68'.

The foregoing three objectives of FIG. 5 are accomplished in the following manner.

The pulse train from the speed computing means 38 of FIG. 1 is supplied to the shaper 210 of FIG. 5 where it is shaped into pulses of uniform length and magnitude. These shaped pulses are then supplied through an isolating resistor 211 to one input of operational amplifier 212, the other input thereof being grounded.

In accordance with well known characteristics of operational amplifiers the output voltage of the amplifier 212 will increase proportionately to the number of equal energy pulses supplied thereto. Thus the output voltage of amplifier 212, at the end of the speed computation, is a d-c voltage whose magnitude is proportional to the velocity of the vehicle.

It is to be noted that during the time the pulse train is being supplied to the operational amplifier 212 the switch 214 is opened so that the resistor 213 effectively is out of the circuit. At the end of a cycle of operation of the device the switch 214 will be closed, in a manner to be described later, to discharge capacitor 215 and prepare the circuit for a subsequent operation.

If, at the end of the speed computation, it is determined that a violation has occurred, there is provided a signal on the input terminal 180' of flip-flop 232. Such signal is derived directly from the output of NAND gate 136 of FIG. 4.

The setting of flip-flop 232 functions to energize the relay winding 220 and closes armature 119 upon contact 217, thereby supplying the speed-proportional voltage at the output of amplifier 212 to differential amplifier 222. The servo motor 223 will thereby be caused to rotate until slidable contact 224 moves to a point on voltage divider 226 which is equal to the voltage supplied from operational amplifier 212.

The angular velocity of the servo motor 223, however, is proportional to the difference in voltages supplied to the differential amplifier 222 so that mirror 68' will track at a rate substantially proportional to the velocity of the vehicle.

It is to be noted that the tracking of the vehicle by mirror 68' with the structure of FIG. 5 is not precise. Such tracking rate, however, is sufficiently accurate to compensate for most of the vehicle's velocity component that is normal to the line of sight from the camera and thereby eliminates most of the blurring effect that would be caused by such normal component of velocity.

In order to ensure that the mirror 68' is positioned properly to establish a line of sight from the camera to the car at the time the stop sensor is actuated, the armature 119 is caused to close upon contact 118 so that battery source 121 is supplied to one of the inputs of differential amplifier 222 during all non-tracking periods.

The value of battery 121 is selected so that when servo motor 223 moves slidable contact 224 to the nulling position on divider 226, the mirror 68' will provide a line of sight from the camera to the vehicle as said vehicle actuates the stop sensor.

II. E. Slow Car Detecting Means (FIG. 6)

The function of the circuit of FIG. 6 is to inhibit the taking of a picture of any vehicle traveling under 4 miles per hour. It is assumed that under such conditions there is either an emergency condition and the vehicle is coming to a stop, or there is heavy traffic moving at a very slow rate. In both cases no picture is desired.

Should a car with a 10 foot wheel base and traveling at a speed of 4 miles per hour, or less, pass the start sensor 20 of FIG. 1 the NOR gate 73' of FIG. 6 will become conductive and pass the 2048 HZ pulse train into the 12 bit time register 72'.

It is to be noted that NOR gate 73' and the 12 bit time register 72' correspond to similarly identified logic elements in FIG. 2, although unprimed.

At 3 miles per hour, for example, the car will travel only a little under 9 feet in the 2 seconds required to fill the 4096 bit capacity time register 72' with the 2048 HZ train of input pulses.

Thus, before the front wheels reach the stop sensor 21 of FIG. 1, which is over 11 feet from the start sensor 20, the register 72' of FIG. 6 will become full and will produce a negative output pulse 241.

Such output pulse 241 is supplied to the input control terminal C of the JK flip-flop 235. The said JK flip-flop 235 has its J control set to a 1 and its K control set to a 0. Thus, said input pulse 241 will cause the JK flip-flop to toggle so as to produce a 1 on its Q output and a 0 on its $\bar{Q}$ output.

The low level output signal on the $\bar{Q}$ output of flip-flop 235 is supplied via lead 259 to an input of NAND gate 136' which corresponds to the NAND gate 136 of FIG. 4.

Such low level output will prohibit an output pulse from said NAND gate 136' for as long as it exists. Consequently, no pulse can be supplied through camera interface 124' to activate the camera relay (not shown in FIG. 6).

The duration of the low level signal from the $\bar{Q}$ output of JK flip-flop 235 is represented by waveform 238 and is controlled by the 1.4 second extend circuit 126' of FIG. 4, the pulse shaper 127' and the pulse generating means 26''.

More specifically the pulse 241 is supplied through lead 258 to NAND gate 170 of FIG. 4 where it will produce an output pulse 171 which activates the 1.4 second extend circuit 126' in the manner discussed hereinbefore to produce a delay pulse of 3.73 seconds.

Alternatively the output pulse can be supplied directly to a third input (not shown) of NAND gate 25'' to provide a 2.33 second delay pulse.

It is to be noted that if less than a 2.0 second pulse delay were generated at the output $\bar{Q}$ of JK flip-flop 235, it would be possible to obtain a false speed reading. Such possibility is discussed further below.

Assume that a car having an eight foot wheel base has both its front and rear wheels roll over the start sensor 20 of FIG. 1 and then further assume that the car comes substantially to rest between the start and stop sensors. If the delay pulse 238 of FIG. 6 were less than 2.0 seconds in length, and since the output pulse 241 from time register 72' occurs only once every two seconds there would be a time interval during each cycling of the register 72' during which the front wheels of the vehicle could actuate the stop sensor 21 and energize the computing portion of the system. If the computed speed fell within a prohibited speed zone the camera would be activated.

However, with the length of the delay pulse 238 greater than 2 seconds, i.e., equal to either 2.33 seconds or 3.73 seconds, it is not possible for NAND gate 136' to become conductive during any portion of the count of register 72' once it has generated a first output pulse 241.

JK flip-flop 235 is reset via lead 137 at the termination of the time delay pulse by the output 137 of the reset pulse generator 190 of FIG. 3. The positive-to-negative transition of the time delay pulse also functions to reset register 72' of FIG. 6.

Figure 6A:
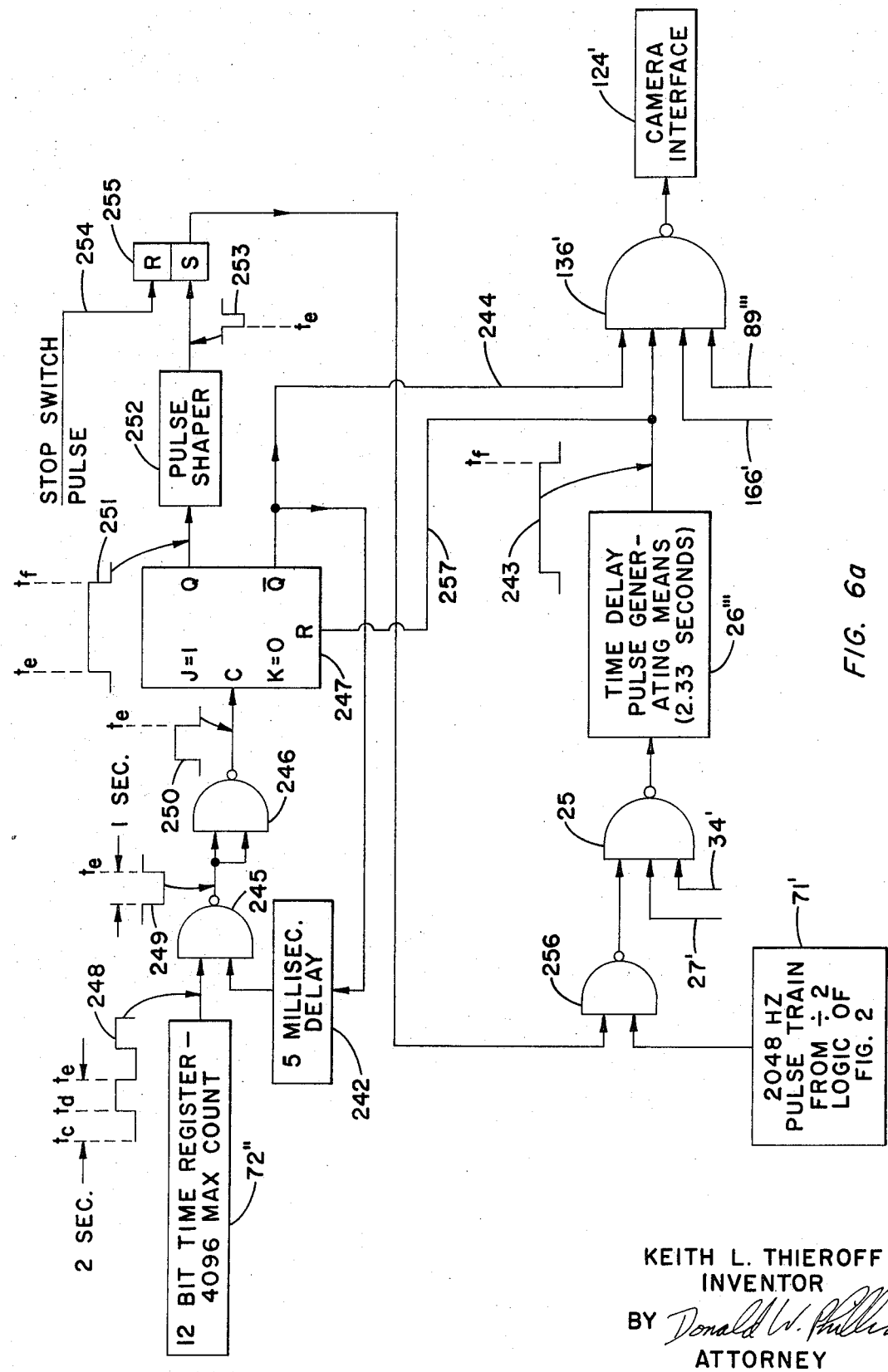
FIG. 6a is an alternative means for preventing camera actuation when the speed is below a predetermined value.

Another form of slow car detecting means is shown in FIG. 6a. *As in the case of the structure of FIG. 6, when more than 2 seconds elapse between the activation of the start switch and the stop switch, the 12 bit time register 72' will then supply a signal through NAND gate 245 and INVERTER 246 to change the state of the J-K flip-flop circuit 247 so that the Q output will be a binary 1 and the $\overline{Q}$ output will be a 0.*

It is to be noted that the foregoing can occur only when the J-K flip-flop 247 is initially in its reset condition with a binary 1 appearing on the $\overline{Q}$ output thereof. Such a binary 1 is supplied to one of the inputs of NAND gate 245 to condition said NAND gate for passage of the 1 to 0 transition of the most significant bit of time register 72'' when said register is reset to 0.

More specifically in FIG. 6a the waveform 248 represents the condition of the most significant bit of register 72'' as the register counts to its capacity. Assume that the count starts from zero at time $t_c$. Then when the register is half full the most significant bit will change its state from a low lever (0) to its high level (1), as shown at time $t_d$. When the count register 72'' reaches its full capacity, the most significant bit will change back to a 0, as shown at time $t_e$ in waveform 248.

As discussed hereinbefore two seconds are required to fill the register 72''. Thus the interval of time $t_d - t_e$, during which the most significant bit is at its upper level, is equal to 1 second.

Since the $\overline{Q}$ output of J-K flip-flop 247, during the time interval $t_d - t_e$ is a 1, the NAND gate 245 will function to produce the negative one second pulse 249 in response to the positive one second pulse supplied thereto.

INVERTER 246 will then function to invert said negative pulse 249 to produce the one second positive pulse 250 which is supplied directly to the control input C of J-K flip-flop 247. Said J-K flip-flop 247 is constructed so that it will not respond to the positive-going leading edge of said pulse 250, but will respond to the negative-going trailing edge of said pulse 250, and will at time $t_e$ switch states so that the $\overline{Q}$ output changes from a 1 to a 0 and the Q output changes from a 0 to 1. The Q output is shown as waveform 251, with the transition from the 0 to the 1 occurring at time $t_e$.

It is to be noted that the changing of the $\overline{Q}$ output from a 1 to a 0 performs two functions. Firstly, the 0 is supplied to one input of NAND gate 245, thus preventing any additional overflow signals from register 72'' from being supplied to J-K flip-flop 247 for the duration of the slow car cycle.

If NAND gate 245 were not disabled by the 0 appearing on the $\overline{Q}$ output of flip-flop 247 then it would be possible for a false operation of flip-flop 247 to occur. A more detailed discussion of such false operation will be set forth later herein.

Secondly, and most important, the said 0 output is supplied to an input of NAND gate 136' to thereby prevent energization of the camera solenoid for the duration of the slow car cycle. More specifically the NAND gate 136' cannot produce the low level signal necessary to activate the camera as long as any one of its inputs has a 0 thereon.

The Q output of J-K flip-flop 247 will remain in its high level and the $\overline{Q}$ at its low level until said J-K flip-flop is reset by a reset pulse supplied thereto from time delay pulse generating means 26''' through conductor 257, as will also be discussed in more detail later.

A pulse shaper 252 responds to the change from the low to the high level of the Q output of flip-flop 247 to produce a pulse 253 which in turn functions to set a conventional flip-flop circuit 255.

The setting of flip-flop 255 places a 1 on the upper input lead of NAND gate 256, to thereby permit the 2048 HZ pulse train from divider 71' to pass through said NAND gates 256 and 25''' and into the time delay pulse generating means 26'''. It is to be noted that NAND gate 25'''' corresponds to the NAND gate 25 of FIG. 1 and that its two other inputs 27' and 35' correspond to inputs 27 and 34 of FIG. 1. As will be recalled the signals on both of the input leads 27' and 34' are normally high level signals so that the 2048 HZ pulse train is able to pass through NAND gate 25'''' to energize pulse generating means 26'''. The 2048 HZ pulse train will continue to reenergize the time delay pulse generating means 26''' as long as flip-flop 255 remains set.

Resetting of flip-flop 255 occurs when the stop switch in the road is activated so that a stop switch pulse is supplied via lead 254 to the reset input of flip-flop 255.

It is to be noted that at the termination of the pulse generated by pulse generating means 26''' the J-K flip-flop 247 is reset via lead 257. Resetting of J-K flip-flop 247 causes a 1 to appear on the $\overline{Q}$ output thereof to again condition NAND gate 245 to pass a pulse therethrough the next time the 12 bit time register 72'' counts to its capacity.

It is to be noted also that the output 243 of time delay pulse generating means 26''' is supplied to an input of NAND gate 136' as well as being supplied to the reset input of the J-K flip-flop 247. The reason for such connection to NAND gate 136' is as follows. The said NAND gate 136' is disabled by a 0 output from the $\overline{Q}$ output of J-K flip-flop 247 until time $t_f$ when the J-K flip-flop is reset and a 1 appears on its $\overline{Q}$ output, which will not disable NAND gate 136'. However, at this time $t_f$ the output pulse generating means 26''' falls to 0, thereby insuring a continued disabling of NAND gate 136'.

Without such continued disabling of NAND gate 136' it would be possible to obtain a false energization of the camera in the following manner. As mentioned above, during the slow car cycle the computed velocity can be of any value. Consequently at time $t_f$ a 1 can exist on input lead 166'', which is the output from the decimal counter 121' and the NAND gate 161 of FIG. 4. A 1 can also exist on the input lead 89''' which carries the output from overflow stage 77 of distance register 76 of FIG. 2.

Thus, if both the distance register 76 of FIG. 2 and the decimal counter 121' of FIG. 4 were not reset quickly enough at the end of the cycle, then it would be possible for the three inputs 166'', 89''' and 257 to all have 1's thereon immediately after the resetting of J-K flip-flop 247, at time $t_f$. Consequently, in the absence of the low level output from pulse generating means 26''' being supplied to the fourth input of NAND gate 136', a false operation of the camera could occur.

The specific functions of NAND gate 245 and INVERTER 246 will now be discussed in detail. As mentioned above the basic reason for NAND gate 245 and INVERTER 246 is to prevent a false switching of J-K flip-flop 247 by a late output signal from 12 bit time register 72'' during the slow car cycle.

More specifically, when said stop sensor is actuated the NOR gate 73 of FIG. 2 becomes disabled to disconnect the 2048 HZ output of divider 71 from the 12 bit time register 72.

At the time of such disconnection the 12 bit time register 72 will have some random count therein. Based on such random count the system will compute some meaningless velocity.

At the end of this velocity computation, i.e., at time $t_f$ in FIG. 6a, the 12 bit time register 72'' will be reset to zero. Also at time $t_f$, and by the same negative transition of the time delay pulse 243, the J-K flip-flop 247 will be reset so that the $\overline{Q}$ output will have a 1 thereon. It is impossible that the resetting of the 12 bit time register 72'' to 0, if its most significant bit contains a 1 at the time of such resetting, would occur after the resetting of J-K flip-flop 247 and, in the absence of delay means 242, would cause a signal to be supplied through NAND gate 245 and INVERTER 246 to again change the state of said J-K flip-flop circuit.

However, because of the 5 millisecond delay means 242 the effect of the 1 to 0 change occurring at the $\overline{Q}$ of J-K flip-flop 247 will not reach NAND gate 245 until well after the 12 register 72'' has been reset to 0. Accordingly, the NAND gate 245 will effectively remove any possibility of false operation.

It is to be noted that where the J-K flip-flop 247 is of the type where the steady state reset level overrides the effect of a pulse supplied to control input C, the NAND gate 245, the INVERTER 246 and the delay means 242 are all unnecessary. The output of the register 72'' can be connected directly to the control input C of the J-K flip-flop 247.

III. GENERAL DISCUSSION OF MULTI-LANE MODE

A. General Systems (FIGS. 7 and 8)

Figure 7:
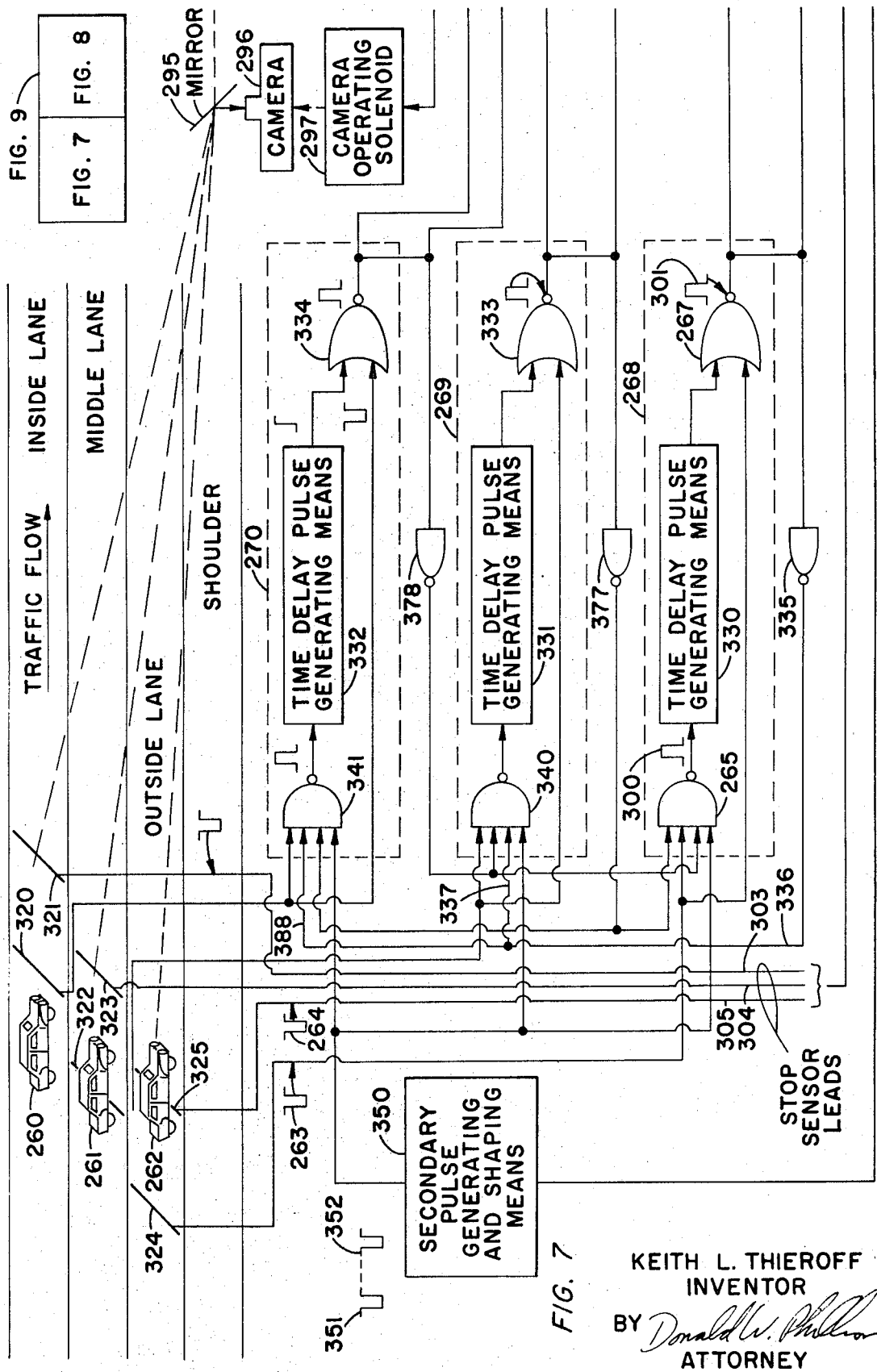
FIGS. 7 and 8 show the logic diagram for a multi-lane mode of the invention.
Figure 8:
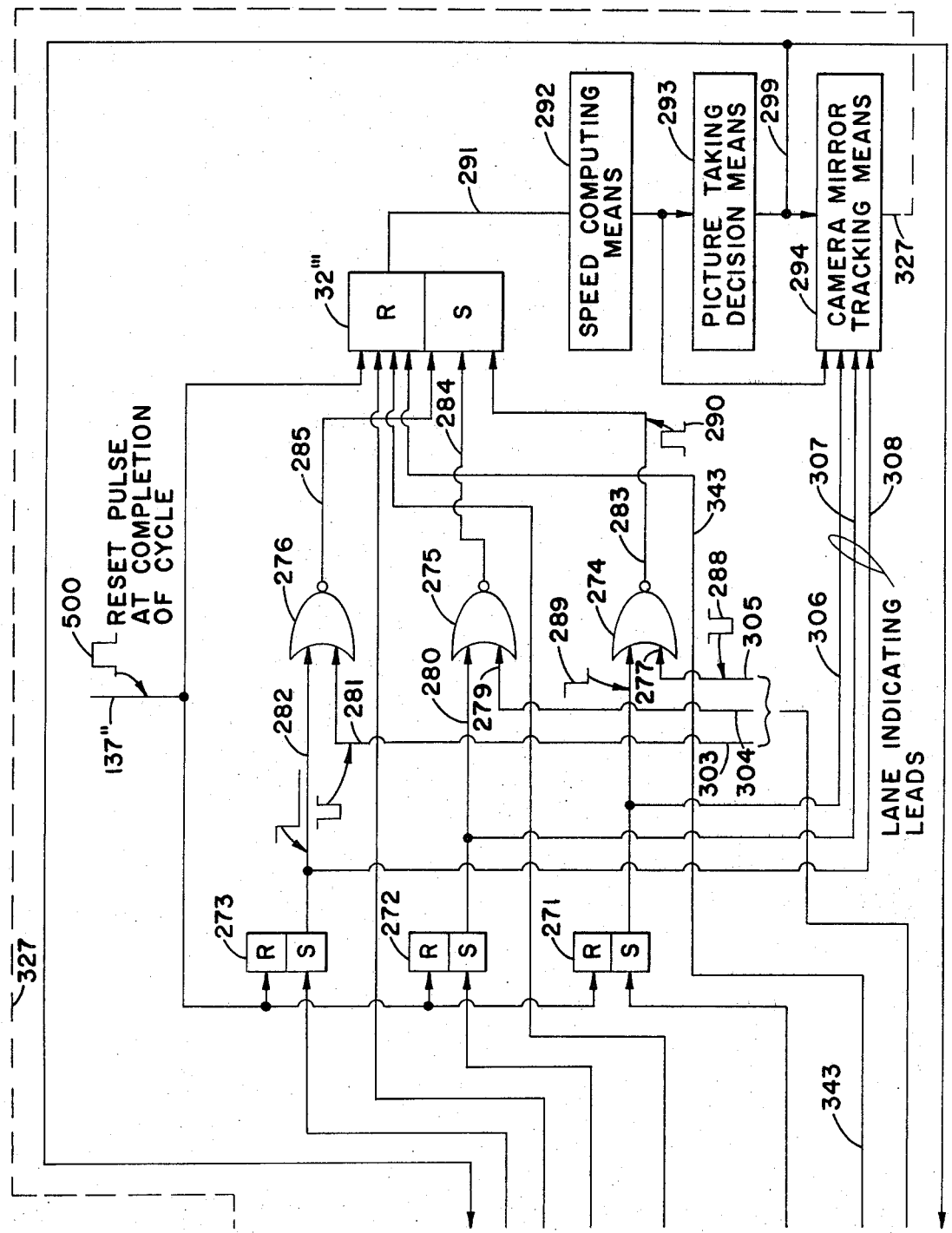
Figure 9:
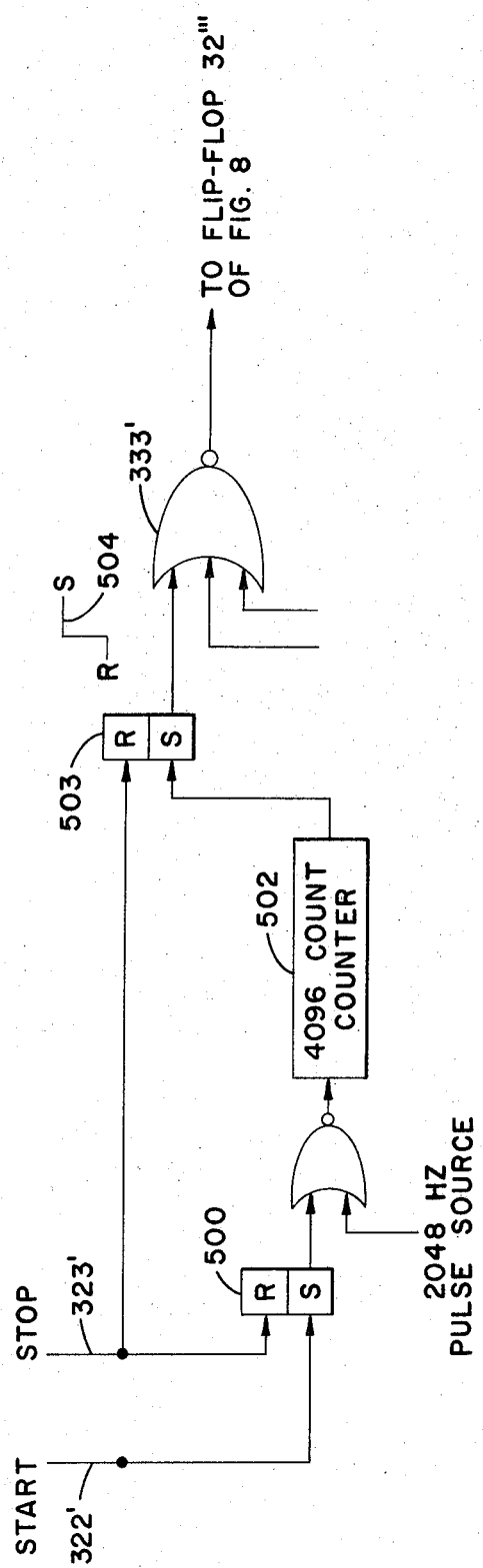
FIG. 9 shows how FIGS. 7 and 8 fit together.

In FIGS. 7 and 8 there is shown a form of the invention adapted to monitor three lanes of traffic, identified as the inside lane, the middle lane, and the outside lane. A shoulder on the side of the road is also presumed to exist, with a camera 296 and a mirror 295 positioned just off said shoulder.

The operation of the logic in FIG. 7 is very similar to that of the operation of the logic of FIG. 1. The principal differences are that in FIG. 7 a separate pair of start and stop sensors are employed for each lane of traffic, and a separate time delay pulse generating means and associated logic circuits 270, 269 and 268 are provided for each of the three pairs of start and stop sensor, 320–321, 322–323, and 324–325 respectively. It is to be noted, however, that the NOR gates 276, 275, and 274 of FIG. 8, each of which corresponds to the NOR gate 31 of FIG. 1, are not included in the blocks 270, 269, and 268 of FIG. 7.

There is also provided in FIG. 7 an anti-contention circuit which functions to prevent cars in other lanes from actuating the computation means and the camera means after said computation means and camera means have been actuated by a car in any given lane.

Such anti-contention circuit primarily comprises the inverters 378, 377, and 335, which connect the outputs of NOR gates 334, 333, and 267, respectively, to inputs of those two NAND gates of NAND gates 341, 340, and 265 which are associated with the other two lanes of traffic.

Thus, for example the inverter 335 connects the output of NOR gate 267, which is associated with the outside lane of traffic, to inputs of NAND gates 340 and 341, which are associated, respectively, with the middle and the inside lanes of traffic.

Essentially these feedback circuits function to energize the two remaining time delay pulse generating means, (of the three delay pulse generating means 332, 331, and 330) once the first one has been energized by a pulse from a start sensor in a given lane. In this manner the subsequent energization of the computing means and the camera are prevented by actuation of the start sensors in all three lanes, at least until the cycle of operation is completed, and in some cases even longer, as will be discussed later herein.

In FIG. 8 the three flip-flop circuits 273, 272 and 271 are set as a result of actuations of start sensors 320, 322, and 324, respectively, but only by those start sensor actuations which initiate an operating cycle. Thus only one of the flip-flop circuits 273, 272, or 271 can be set at any given time. Such set condition of the flip-flop is utilized as the means for indicating the lane in which the monitored car is traveling.

As will be discussed later the camera mirror tracking means 294 responds to such set condition of one of the flip-flops 273, 272, or 271, via leads 306, 307, and 308, to modify its tracking path and rate accordingly.

The flip-flop circuit 32'''' of FIG. 8 corresponds to the flip-flop circuit 32 of FIG. 1.

The speed computing means 292 and the picture taking decision means 293 in FIG. 8 are substantially the same as the speed computing means 38 and the picture taking decision means 39 of FIG. 1.

The three cars 260, 261, 262 are shown as traveling in the inside lane, the middle lane, and the outside lane respectively.

A. NOR gate logic flip-flop (FIG. 10)

Figure 10:
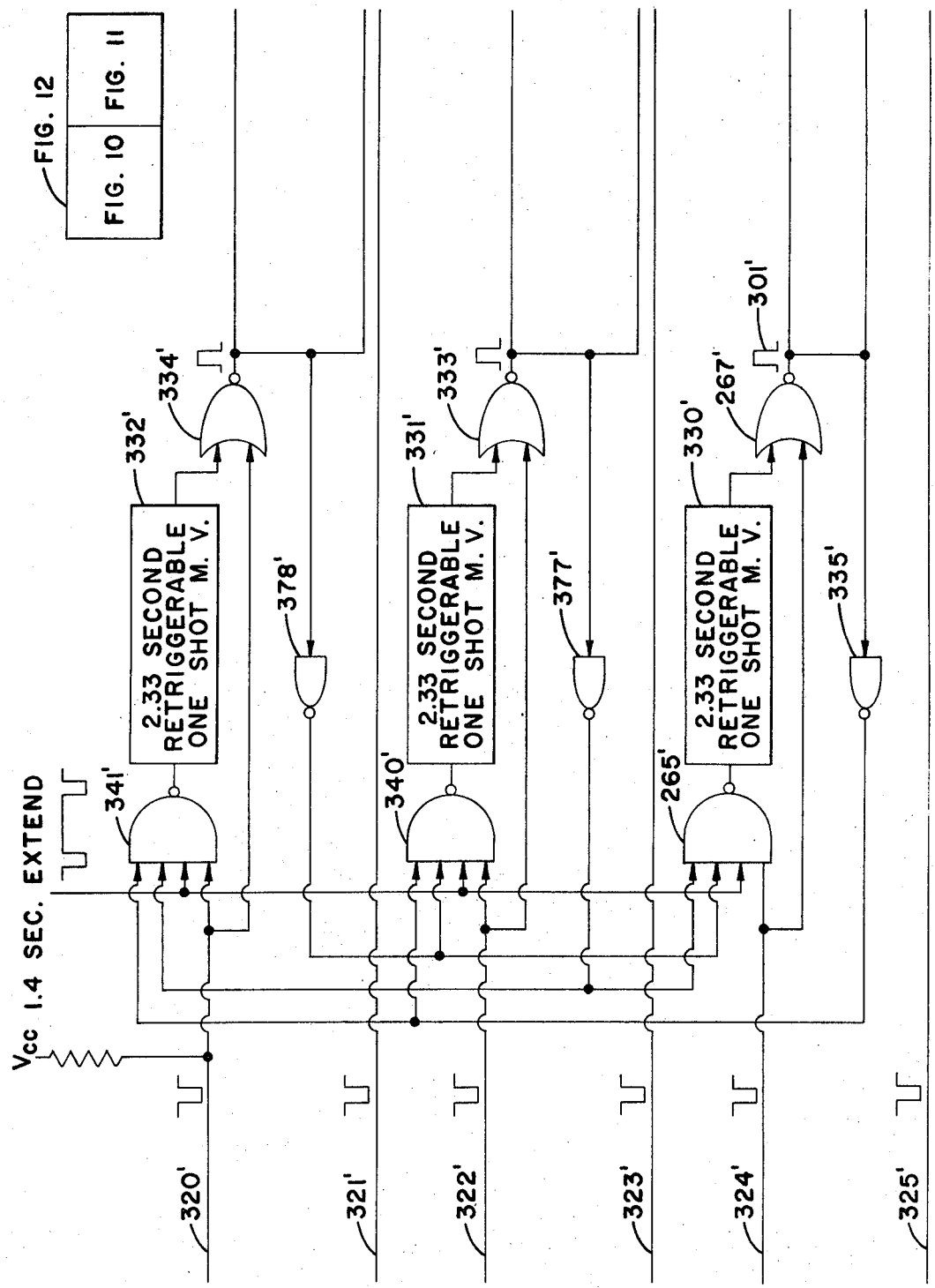
FIGS. 10 and 11 show a more detailed logic diagram of the structure of FIGS. 7 and 8 and in particular show a more detailed level of the logic employed in the NOR gate type flip-flop circuits of FIG. 8.
Figure 11:
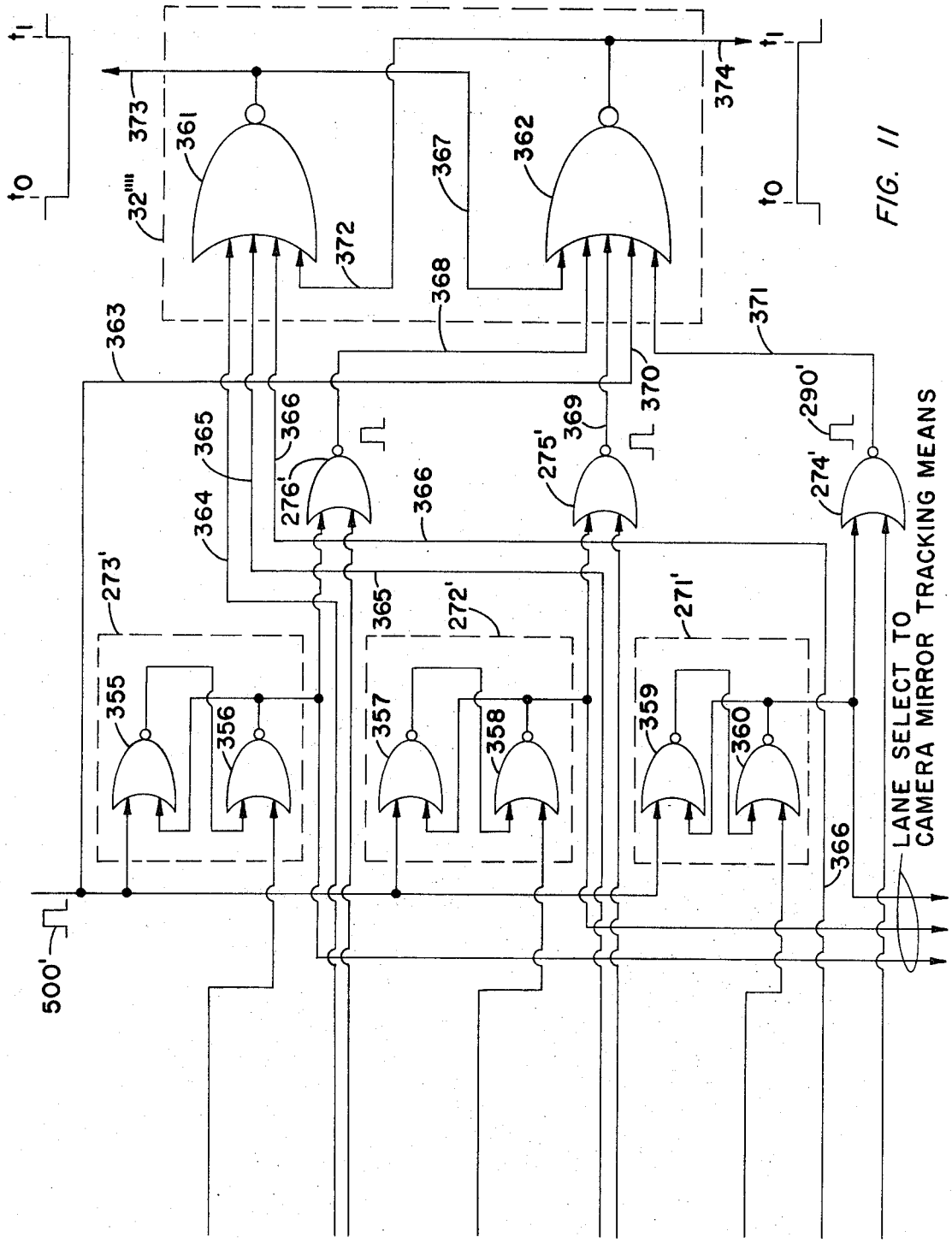

The logic of FIGS. 10 and 11 is a more detailed showing of the logic of FIG. 7 and 8 but does not show the three lanes of the roadway nor the automobiles.

FIGS. 10 and 11, however, do show the logic details of the flip-flops 271, 272, 273, and 32''' of FIGS. 7 and 8. Such flip-flops are identified within the blocks 271', 272', 273', and 32'''' of FIGS. 10 and 11.

It will be noted in FIGS. 10 and 11 that each of the flip-flop circuits 271', 272', 273', and 32'''' are each comprised of two NOR gates.

More specifically flip-flop 271' is comprised of NOR gates 359 and 360; flip-flop 272' is comprised of NOR gates 358 and 357; flip-flop 273' is comprised of NOR gates 356 and 355; and flip-flop 32'''' is comprised of NOR gates 361 and 362.

Since all of these NOR gate type flip-flop circuits operate in substantially the same manner only one will be described in detail later herein. The operation of the others will then be readily apparent.

III. B. multi-lane logic for approximate tracking (FIG. 13)

Figure 13:
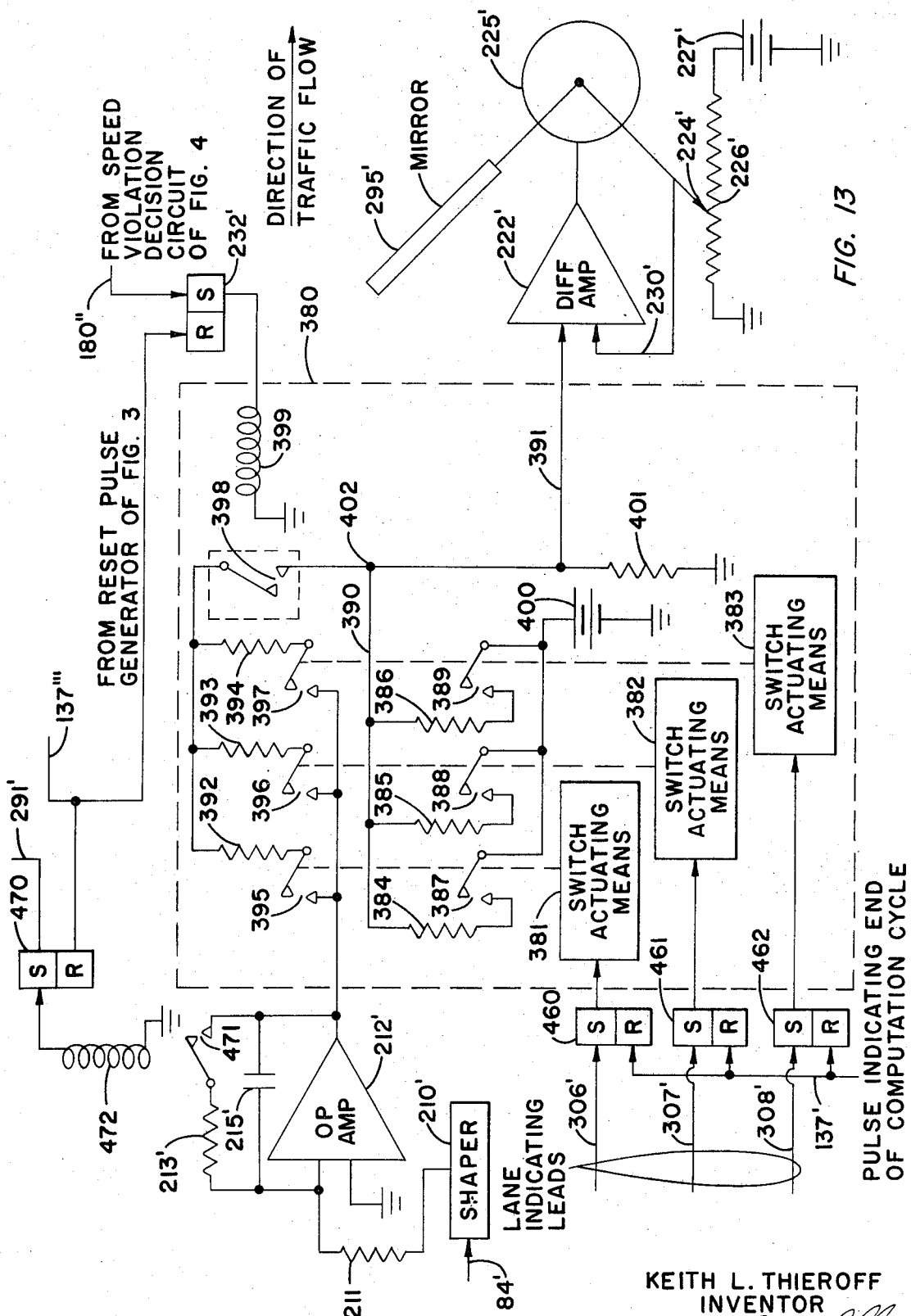
FIG. 13 is a diagram of the logic employed in the multi-lane mode for enabling the camera to optically track a violating vehicle in an approximate manner in accordance with its computed speed and in accordance with the lane in which it is traveling.

The circuit of FIG. 13 is similar to that of FIG. 5 and corresponding elements have been identified by the same reference characters, although primed.

The major difference between FIG. 13 and FIG. 5 is that the logic of FIG. 13 is adapted for multi-lane operation rather than single lane operation. The specific logic and circuit means added in FIG. 13 to accommodate multi-lane operations is included within the dotted rectangle 380.

More specifically within block 380 there are three switch actuating means 381, 382, 383 which are selectively operable in response to signals supplied via the lane indicating leads 306', 307', and 308'.

Two pairs of contacts are associated with each of the switch actuating means 381, 382 and 383. More specifically the normally open pairs of contacts 395 and 387 are operable by switch actuating means 381; the normally open pairs of contacts 396 and 388 are operable by switch actuating means 382; and the normally open pairs of contacts 397 and 389 are operable by switch actuating means 383.

It is to be noted that when any one of the switches 387, 388 or 389 are closed, one of the resistors 384, 385, or 386, respectively, will be connected in series arrangement with common resistor 401 and battery 400.

Thus if contacts 387 are closed, the resistor 401, the resistor 384 and the battery 400 will form a voltage divider circuit, with a tap 402 thereon, which tap is connected to input 391 of differential amplifier 222'. The voltage appearing at tap 402 will cause the servo motor 225' to rotate the mirror 295' so that it will establish a line of sight with a given lane of the roadway.

The resistors 385 and 386 have values different from resistor 384 and when connected in the circuit will cause the mirror 295' to establish a line of sight with the other two lanes of the roadway.

The resistors 392, 393, and 394 also have different values to provide for slightly different tracking rates, depending upon which lane a given vehicle is traveling, even though the velocity of the vehicle is the same for each line.

However, as discussed in connection with FIG. 5 it is not desired to connect the output of operational amplifier 212' to the differential amplifier .' unless a violating vehicle is being monitored. In the event the vehicle is violating the speed limit a switch 398 is caused to be closed by means of a signal supplied to the set side of flip-flop 232' via input lead 180''.

It is to be noted the tracking system shown in FIG. 13 is an approximate system, as is the single lane tracking system of FIG. 5.

III. C. Multi-Lane Logic For Precise Tracking (FIGS. 14 and 15)

In FIG. 14 there is shown the logic diagram for causing the mirror to track a speeding vehicle with high precision. Before examining the logic of FIG. 14, however, a brief review of the chart of FIG. 15 will be made in order to facilitate a better understanding of FIG. 14.

In FIG. 15 the three lanes on one side of a 6-lane highway are shown and are identified as lane 3, lane 2 and lane 1, with lane 3 being the inside lane. Also shown is a shoulder, with the camera 296' located off the shoulder as well as the rotatable mirror 295''.

The vertical line 410 represents the plane of the front end of a car in lane 1 at the completion of the computation of the speed of the car, and further, at the time the decision is made as to whether such speed is a violation.

The point 413 in lane 1 represents the front of said car after the camera has tracked the car for a short distance $Vt$, where $V$ is the velocity of the car and $t$ is the time interval required for the front of the car to travel from the plane 410 to the point 413.

It is apparent that the point 413 will move along the road to the right in FIG. 15 as a function of time. Similarly the angle 2 between the line of sight R and the direction of the car, designated by the vector V, will be a variable angle.

Thus the following relations can be determined.

$V \sin 2\theta = R \, d\theta/dt$ where $V$ = car velocity vector $2\theta$ = angle between velocity vector $V$ and line of sight between mirror and car.

and $R$ = Distance from camera to car    Exp. (5)

$d(2\theta)/dt = V/nL \sin^2 2\theta$ where $L$ = Lane width and $n$ = Lane number +1, and $R = nL/\sin 2\theta$    Exp. (6)

$$\therefore 2\theta = \int \frac{V}{nL} \sin^2 2\theta \, dt \quad \text{Exp. (7)}$$

The structure of FIG. 14 is designed to calculate the value of $2\theta$ as shown in expression 7. The specific structure for computing $2\theta$ includes integrator 436, the block 439 for computing the function $\sin^2 2\theta$, and block 441 for computing the value $V/nL$.

As in the camera tracking means of FIG. 14 there is provided flip-flop circuits 420, 421 and 422, one of which will be responsive to energization of the corresponding lane indicating leads 306'', 307'', and 308'' to become set. The corresponding switch actuation means of the three switch actuation means 423, 424 and 425 will function to actuate the corresponding pairs of normally open contacts 426, 427, and 428.

The three resistors 432, 433 and 434 are connected in series with the positive battery source 450 to form a voltage divider having three adjustable taps 429, 430 and 431 thereon.

Depending upon which lane the vehicle is in, one of the switches 426, 427 or 428 is closed to supply to integrator 436 a voltage from one of the voltage divider taps 429, 430 or 431, and having a magnitude such as to position the mirror 295'' with its line of sight directed to the proper lane. A fourth switch actuation means 443 responds to an indication of a violation to close switch 438 to initiate the tracking function.

It is apparent that if a voltage proportional to the initial value of $2\theta$ is supplied at the output of integrator 436 the block 439 will compute a value equal to $\sin^2 2\theta$, which value will then be multiplied by the term $V/nL$ to produce the quantity $d(2\theta)/dt$, which in turn is supplied to integrator 436.

Thus the output of integrator 436 is a variable equal to $2\theta$ which is supplied to the differential amplifier 222'' to cause tracking by mirror 295'' to occur.

IV. OPERATION OF MULTI-LANE MODE

A. General System (FIGS. 7 and 8)

In describing the operation of the system of FIGS. 7 and 8 it will be shown that a car 262, whose front wheels have passed both the start sensor 324 and the stop sensor 325, is utilizing the common speed computing means 292 and camera tracking means 294 of the system to the exclusion of the cars 261 and 260. The foregoing is insured by the aforementioned contention circuit which functions as described in the following paragraphs.

Associated with each lane is logic for initiating cycling of the system in response to a car passing over the start sensor in that lane, assuming the system to be in a non-cycling condition originally. Such logic means is enclosed within block 270 for the inside lane, within block 269 for the middle lane, and within block 268 for the outside lane.

Each of the blocks 270 and 269 and 268 contain logic equivalent to the NAND gate 25, the pulse generating means 26, and the NOR gate 30 of FIG. 1, and perform the same function.

In the operation of the device assume that the car 262 passed over start sensor 324 at a time when the system was in a non-cycling condition and before car 261 passed over start sensor 322 in the middle lane. A start pulse 263 will be generated by start sensor 324 and will be supplied to NAND gate 265 and also to one input of NOR gate 267.

Since all the inputs to NAND gate 265 are 1's at the time negative pulse 263 is supplied thereto, there will be produced a positive pulse 300 at the output of NAND gate 265 which will energize a pulse generating means 330 in the same manner as described in connection with FIG. 1.

However, also as described in FIG. 1, a short interval of time is required before the output of the pulse generating means 330 can change from its low to its high level. During this short interval of time NOR gate 267 will function to produce a positive output pulse 301 which functions to set flip-flop 271 (FIG. 8) and also is fed back through inverter 335 to inputs 337 and 338 of NAND gates 340 and 341, respectively, thus producing pulses at the output of said NAND gates 340 and 341, and initiating 2.33 second time delay pulses at the outputs of pulse generating means 331 and 332, respectively.

The generation of the time delay pulses by pulse generating means 331 and 332 functions to prevent cars 261 and 260 from energizing the speed computing means 292. More specifically for example, if pulse generating means 331 has been energized before car 261 actuates start sensor 322 then no output pulse can be produced at the output of NOR gate 333, since the output of pulse generating means 331 is at its high level at the time of generation of the pulse by start sensor 322. Similarly no output pulse can be produced at the output of NOR gate 334 by car 260 as it passes over start sensor 320 in the inside lane.

The pulse 301 generated at the output of NOR gate 267, in addition to energizing the non-contention means described immediately above, also sets flip-flop 271 in FIG. 8 and resets flip-flop 32''' through lead 343. The setting of flip-flop 32''' initiates the speed computing means 292 as discussed in connection with FIG. 1

The setting of flip-flop 271 performs a function not described in connection with FIG. 1 and which is unique to the multi-lane mode. More specifically the setting of flip-flop 271 provides a memory indication of which lane the monitored car is in, as well as conditioning NOR gate 274 to be conductive upon actuation of the stop sensor 325 (FIG. 7) in the outside lane.

Memory indication of the monitored lane is important since the camera mirror must be preset to provide a line of sight to that lane during computation. The lead 306 can be seen to connect the set output of flip-flop 271 to the camera tracking means 294. The specific means by which the camera tracking means 294 responds to the input signal on lead 306 will be discussed in connection with FIG. 14 later herein.

It is to be noted that only one of the flip-flops 271, 272 or 273 can be set during any cycling operation. Thus when flip-flop 271 is in a set condition, the flip-flops 272 and 273 must be in a reset condition. It follows also that NOR gates 275 and 276 are not conditioned to pass pulses when the stop sensors 323 and 321 in the middle and inside lanes are activated.

It will be apparent from the foregoing that the flip-flop 32''', which controls the initiation and termination of speed computing means 292 can be energized by the start and stop sensors in only one lane during any given cycling operation.

Up to this point in the discussion of the multi-lane mode of operation, it has been assumed that only the start sensor 324 has been actuated by a car. As a result of such actuation of start sensor 324, the flip-flop 271 has been set, and the flip-flop 32''' has been reset to initiate computation of speed of the vehicle. More precisely the measurement of the time the car is in the speed zone between the start and stop sensors is initiated. The actual computation of speed is not initiated until the stop sensor is activated.

Assume now that the front wheels of the car 262 pass over the stop sensor 325 to generate a negative stop pulse 264 on lead 305. Such negative stop pulse 264 is supplied via lead 305 to the input 277 of NOR gate 274, and will produce at the output of said NOR gate a positive pulse 290 which functions to set flip-flop 32'''. The setting of flip-flop 32''' functions to terminate the measurement of the time that the car 262 is in the speed zone and initiates the computation of the speed. The picture taking decision means 293 examines the computed speed and decides if it constitutes a violation. If a violation exists the picture taking decision means 293 supplies an output signal via lead 299, to the camera-operating solenoid 297 and also to a secondary pulse generating and shaping means 250, both shown in FIG. 7.

The said secondary pulse generating means 350 responds to the aforementioned signal to produce a pair of negative output pulses 351 and 352, comparable to the pair of output pulses 65 and 66 of FIG. 1. Such output pulses 351 and 352 are supplied to all three of the pulse generating means 330, 331 and 332 through their input NAND gates 265, 340 and 341, respectively.

Each of the pulse generating means 330, 331, and 332 will then extend its delay time to 3.73 seconds to permit the capacitors (not shown) employed to energize the camera flash unit (not shown) to become recharged after the picture of car 262 of FIG. 7 is taken.

It is to be noted that any time a pair of wheels passes over any start sensor the corresponding pulse generator means 330, 331, or 332 will generate a 2.33 seconds pulse regardless of whether the system is in a cycling condition or a non-cycling condition. For example, it can be seen that the front wheels of car 261 in FIG. 7 passed over the start sensor 322 a few miliseconds after the front wheels of car 262 passed over start sensor 324, assuming both cars to be going about 60 miles per hour. Thus even though the anti-contention circuit, described hereinbefore, had previously functioned to energize the time delay pulse generating means 331 in response to the actuation of start sensor 324 by car 262 in the outside lane, the said pulse generating means 331 would have been re-energized a second time when the front wheels of car 261 passed across start sensor 261.

Later when the rear wheels of car 261 cross start sensor 322, the time delay pulse generating means 331 will again generate a 2.33 second pulse. It is to be noted that each time such a pulse is initiated it extends the preceeding delay pulse, should one have been occurring.

Thus even after the full 3.73 seconds has expired in response to the pulses 351 and 352, and pulse generating means 330 (of the outside lane) has returned to its lower level, either or both of the pulse generating means 331 and 332 can still be at their higher levels if cars had passed across the start sensors in the middle or inside lanes before the expiration of the 3.15 second time interval.

The foregoing is important in that not only must the cycle of operation be completed, but also the time delay pulse generating means in a given lane must have returned to its lower level, in order for the system to be ready to process the speed of another car.

Thus once a pulse generator means, such as pulse generator means 332 associated with the inside lane for example, has been energized and caused to assume its higher level, a steady stream of cars passing there across at time intervals less than 2.33 seconds will maintain said pulse generating means 332 in its upper level. Consequently the system will never become ready to process the speed of a car traveling on said inside lane, until the output of the time delay pulse generating means 332 returns to its lower level.

However, even if the inside lane had such heavy traffic that pulse generating means 332 did not return to its upper level for a long period of time, such a condition would not prevent the pulse generating means 331 associated with the middle lane, or the pulse generating means 330 associated with the outside lane, from becoming ready for the processing of another speeding vehicle.

From the foregoing it can be seen that to some extent the circuitry associated with the inside lane, the middle land and the outside lane function independently, one from the other.

The aforementioned characteristic of the logic however is an important feature of the invention. Since each time delay pulse generating means is operated each time a pair of wheels crosses thereacross, regardless of whether the system is cycling or not, it is virtually impossible for a situation to arise whereby the rear wheels of a car are straddling a start sensor of a given lane at the time when the output of the time delay pulse generating means associated with said given lane, goes to its lower level, thereby initiating cycling of the system by the rear wheels of the car.

Similar to the case of the single lane mode of the invention, the only possible case where such an event could happen would occur when a car was traveling at a speed lower than 4 miles per hour, wherein the 1.75 seconds time delay, caused by actuation of the start sensor by the front wheels would terminate before the rear wheels reached the start sensor. To protect against such an occurrence the logic of FIG. 8a is provided for each lane of traffic. In FIG. 8a actuation of the start sensor 322' sets flip-flop 500 to cause NOR gate 501 to pass the 2048 HZ pulse source to 4096 count counter 502. In the case of a car going under 4 MPH the counter 502 will count to its capacity after 2 seconds and then produce an output signal to set flip-flop 503. The setting of flip-flop 503 functions to inhibit NOR gate 333', which corresponds to NOR gate 333 of FIG. 7, from producing any output signal until the stop switch 323' of FIG. 8a has been actuated to reset flip-flop 503. The inhibiting of NOR gate 333'' prevents energization of the computing means by a car in the middle lane of FIG. 7. Similar logic means are provided for the inside and outside lanes.

Similarly a car closely following car 262 cannot initiate cycling with its rear wheels. For the reasons discussed above, if cycling is occurring either due to car 262, or because it has been re-initiated by a car in one of the other two lanes, the output of time delay pulse generating means 330 will be at its upper level, so that passage of the front wheels of said following car over start sensor 324 will function only to extend the delay pulse in the generating means 266 by another 2.33 seconds, which period of time should be more than ample for the rear wheels to pass over the start sensor.

It is inconceivable that a car could be following car 262 so closely as to have its front wheels pass over start sensor 324 before the expiration of the 2.33 second delay caused by the rear wheels of car 262, and yet be going less than 3 miles per hour.

If there were a long line of slow moving traffic all moving at less than 3 miles per hour then the logic of FIG. 8a would control to prevent the taking of any pictures.

IV. A. 1. NOR gate Logic Flip-Flop (FIGS. 10 and 11)

As discussed above the logic of FIGS. 10 and 11 is similar to the logic of FIGS. 7 and 8 with the exception that in FIGS. 10 and 11 the details of the flip-flop circuits 273', 272', 271', and 32'''' are shown.

All four of these flip-flops employ a pair of NOR gates and all four flip-flops operate essentially alike. Since the flip-flop circuit 32'''' is the most complex flip-flop of the four, i.e., has the most input leads, the operation thereof will be discussed. The operation of the other three flip-flops 271', 272', and 273' will then be readily apparent.

Basically a NOR gate functions in the following manner. Two level signals are supplied to its input leads, the lower level usually being designated as a binary 0 and the upper level a binary 1. If all of the signals supplied to the input terminals of the NOR gates are 0's then the output of said NOR gate is a 1, i.e., an upper level signal. However, if the signal supplied to any one of the input terminals of a NOR gate is a 1, then the output of said NOR gate is a 0, or a low level signal.

Thus, if the four input leads 364, 365, 366 and 372 of NOR gate 361 all have 0's thereon, the output of NOR gate 361 will be a 1, or a high level signal, which will be supplied via lead 367 to an input 367 of NOR gate 362. Under such conditions, i.e., when the output of NOR gate 361 is at its high level, the flip-flop 32′′′′′ is said to be in a reset condition. In such reset condition, since the output of NOR gate 361 is a high level signal and is supplied to NOR gate 362, then by definition of a flip-flop the output of NOR gate 362 is at its low level.

It is to be noted that the flip-flop 32′′′′′ is always in a reset condition at the beginning of an operating cycle and is placed in such reset condition at the termination of the preceding operating cycle by a reset pulse supplied to input lead 363.

In describing the operation of flip-flop 32′′′′′ it will be assumed that it is initially in a reset condition and that one of the start sensors, for example start sensor 324 of FIG. 7, is energized by a pair of wheels to initate the cycling operation. Assume further that when the start sensor 324 is actuated the system is in a non-cycling condition. Consequently a pulse 301′ will be generated at the output of NOR gate 267′ in FIG. 10. This positive output pulse 301′ is supplied to input 366 of NOR gate 361, thus momentarily changing the level of the output of said NOR gate 361 from a high level to a low level. In other words a negative pulse is produced at the output of NOR gate 361, which is equivalent to a zero, and which is supplied via lead 367 to NOR GATE 362.

Since the four other input leads 363, 368, 369, 370 and 371 of NOR gate 362 have 0's supplied thereto at this time, the output of NOR gate 362 will change from its low level to its high level. More specifically a positive pulse, representing a 1, will be generated at the output of NOR gate 362, and will be supplied back to the input 372 of NOR gate 361, thereby causing the output of NOR gate 361 to remain at its low level. Thus in effect the flip-flop 32′′′′′ has been switched from its reset to its set condition, in FIG. 11.

The said set condition is a stable condition and in this set condition the output of NOR gate 361 is at its low level and the output of NOR gate 362 is at its high level.

It should be noted that the three inputs to NOR gate 362 from NOR gate 274′, 275′ and 276′ are 0's in their normally quiescent states.

The fourth input lead 370 to NOR gate 362, which is the reset input lead, is also normally at a 0 condition, except when a reset pulse is supplied thereon.

Later, when the front wheels of the car 262 of FIG. 7 pass over stop sensor 325, a pulse 290′ is generated at the output of NOR gate 274′, as discussed in connection with the logic of FIG. 8.

Such positive pulse 290′ is supplied to NOR gate 362 of flip-flop 32′′′′′ to change the level of the output of NOR gate 362 from its upper to its lower level. Such lower level, representing a zero, is supplied to the input 372 of NOR gate 361 so that now all four of the inputs to NOR gate 361 are zero's. Accordingly the output of NOR gate 361 will change from its low level to its high level. Such high level signal will then be supplied back through lead 367 to the NOR gate 362 to maintain the output of NOR gate 362 at its 0 level.

Thus the flip-flop 32′′′′′ has been switched from its set condition to its reset state, wherein the output of NOR gate 361 is at its high level, and the output of NOR gate 362 is at its low level.

Presumably now the flip-flop 32′′′′′ cannot be switched again until the cycle is completed since the activation of the start sensors cannot produce positive pulses at the outputs of NOR gate 334′, 333′, or 267′.

However, to ensure against any malfunction or any conceivable accidental setting of flip-lop 32′′′′′ the positive reset pulse 500′ is supplied to an input 370 of NOR gate 362 at the completion of each cycle of operation. Thus, if for some reason flip-flop 32′′′′′ had been in a set condition at the end of a cycle, and the output of NOR gate therefor a 1, said reset pulse 500′ will cause said flip-flop 32′′′′′ to assume its reset condition in preparation for the next cycling operation.

IV. B. Multi-Lane Logic For Approximate Tracking (FIG. 13)

For the purpose of discussing the operation of FIG. 13 assume the same conditions as were assumed in connection with FIGS. 7 and 8. As will be recalled, in the discussion of FIGS. 7 and 8 a car 262, traveling in the outside lane, was assumed to have initiated cycling of the system, and further that such car was traveling 120 miles per hour, a violation of the speed limit.

The flip-flop 271 of FIG. 8 is set to respond to actuation of start sensor 324 to produce a high level output signal on lead 306 which is supplied to the camera mirror tracking means 294.

FIG. 13 shows the details of such a tracking means. The incoming signal appears on lead 306′ in FIG. 13 and functions to set a flip-flop 460 which in turn actuates switch actuating means 381. Actuation of means 381 closes both of the normally open sets of contacts 387 and 395. It is to be noted that the three switch actuating means 381, 382 and 383 are normally de-energized so that all of the six pairs of contacts 395, 396, 397, 387, 388, and 389 are normally open.

The closure of the contacts 387 creates a voltage divider comprised of common resistor 401, resistor 384, the closed contacts 387, and positive battery 400. One of the inputs 391 to differential amplifier 222′ is connected to a tap 402 on the aforementioned voltage divider. The potential at said tap 402 is caused to be of such a magnitude that the servo motor 225′ must move slidable contact 224′ to a position on voltage divider 226′ so that mirror 295′ establishes a line of sight to car 262 in the outside lane of FIG. 7, shortly after start sensor 324 is actuated and before the completion of computation of speed of car 262.

It is to be understood that slidable contact 224′ rotates with servo motor 225′ until it finds a potential on the voltage divider 226′, which is substantially equal to the voltage supplied from tap 402 to the other input 391 of differential amplifier 222′. When the two voltages supplied to the two inputs 230′ and 391 of differential amplifier 222′ are equal the servo 225′ has reached what is known as a null condition and no further rotation will take place until additional difference in the voltages supplied to the inputs of differential amplifier 222′ occurs.

It has been assumed that the vehicle is exceeding the speed limit. Under such circumstances a pulse 168, shown at the output of NAND gate 136 of FIG. 4, and generated by the speed violation decision circuit 123′, will be supplied to lead 137′′′ to set flip-flop 232′.

Setting of flip-flop 232' functions to energize relay winding 399 and close the normally open contacts 398, thereby connecting the output of the operational amplifier 212' to the input 391 of differential amplifier 222' through closed contacts 395 and resistor 392. It will be recalled that the contacts 395 are closed by energization of switch actuations means 381 in FIG. 13.

The three resistors 392, 393, and 394 have values which are relatively small compared with the value of resistor 401, which in turn is small in comparison with the values of resistors 384, 385 and 396. It can be seen that when the contacts 395 are closed the two resistors 392 and 401 are connected to form a voltage divider between the output of operational amplifier 212' and ground. However, since resistor 392 is small compared with the value of resistor 401, most of the voltage appearing at the output of operational amplifier 212' will be supplied to the input 391 of differential amplifier 222'.

The specific value of resistor 392 is selected so that the tracking rate of the mirror 295' with respect to the speeding vehicle 262 of FIG. 7 is modified to take into account the fact that the car is in the outside lane.

If the car had been in the inside lane, then switch actuating means 383 would have been energized and pairs of contacts 389 and 397 closed. Closure of contacts 397 would have placed resistor 394 in series with the resistor 401 and the output of the operational amplifier 212'. The value of the resistor 394 is slightly different from that of resistor 392 to accommodate the slightly different line of sight angle which exists between a car traveling in the inside lane of FIG. 7 and a car traveling in the outside lane. Similarly the value of the third resistor 393 is different from either of resistors 392 or 394 to accommodate the angular position of a car traveling in the middle lane with respect to the camera.

At the end of the cycle, when the level of the output signal of time delay pulse generating means 330 of FIG. 7 goes from its high level to its low level, the flip-flops 460, 461 and 462 and 232' of FIG. 13 will all be reset. Reference is specifically made to FIG. 3 which shows the output terminal 137 that is employed to supply the reset pulses to leads 137' and 137''' of FIG. 13.

It is to be understood that the reset pulse generator 190 of FIG. 3 is energized by the plus-to-minus transition of the output signal of single shot multivibrator 26' to produce the reset pulse on its output terminal 137.

As discussed above in Section III – B the pulse shaper 210' of FIG. 13 functions to shape the received velocity-representing train of pulses from NAND gate 83 of FIG. 2 into pulses of equal height and amplitude. Such reshaped pulses are then supplied to an operational amplifier 212' through resistor 211 to produce a d-c output voltage therefrom whose magnitude is proportional to the number of input pulses supplied thereto.

In order to provide a discharge means for the operational amplifier 212' feedback capacitor 215' there is provided a set of contacts 471 in series with a leakage resistor 213'. At the time flip-flop 32''' of FIG. 8 is reset to energize the speed computing means 292 a signal is supplied from flip-flop 32''' via lead 291' of FIG. 13 to set the flip-flop 470. Setting of said flip-flop 470 energizes winding 472 to open normally closed contacts 471. At the end of the cycle the flip-flop 470 is reset by the reset pulse appearing on lead 137''', thereby deenergizing relay winding 472 and permitting the normally open contacts 471 to become closed to provide a discharge path for capacitor 215' and conditioning the operational amplifier 212' for the next cycle of operation.

It is to be noted that had the car 262 of FIG. 7 not been violating a speed law there would have been no output from NAND gate 136 of FIG. 4 and consequently flip-flop 232' of FIG. 13 would not have been set. Thus the relay winding 399 would not have been energized and the contacts 398 would have remained open so that no tracking by the mirror 295' would have occurred.

IV. C. Multi-Lane Logic For Precise Tracking (FIGS. 14 and 15)

As discussed above in Section III – C the structure of FIG. 14 shows a precise tracking means which can be employed as the camera mirror tracking means 294 of FIG. 8, in lieu of the more approximate tracking means of FIG. 13.

In FIG. 14 a signal is supplied to the lane indicating lead 306''' indicating the presence of the actuation of the start sensor 324 in the outside lane of FIG. 7. Such signal sets flip-flop 420 to actuate switch actuation means 423. Energization of switch actuation means 423 closes the normally open contacts 426 to supply the voltage appearing at tap 429 to integrator 436. As mentioned hereinbefore the voltage appearing at tap 429 is representative of the angle $2\theta$, which is the angle between the direction of the car 262 of FIG. 7 and the line of sight to the mirror 295 immediately after the computation of the speed of car 262 has been completed. Such point in time is represented by the vertical line 410 in FIG. 15.

It is to be noted however that the voltage representing the angle $2\theta$ is supplied to integrator 436 immediately after the start sensor 324 of FIG. 7 has been energized, thus providing a short interval of time for the mirror 295' of FIG. 14 to become positioned to provide a line of sight to the car traveling on the outside lane of the road, as indicated in FIG. 15.

The voltage representing the angle $2\theta$ is supplied to differential amplifier 222'' which produces a voltage at its output to drive the servo motor 225'' to its null position in the manner discussed in connection with FIG. 13.

As soon as the speed violation decision circuit 123' of FIG. 4 determines that the car is traveling in violation of the speed laws, a pulse 171' from said decision circuit is supplied to lead 181' in FIG. 14 and functions to reset four flip-flops in FIG. 14. These four flip-flops include flip-flops 420, 421, 422 and 451.

Said flip-flops 421 and 422 are already in their reset condition so no change occurs in the logic following said two flip-flops 421 and 422. However, flip-flop 420 is thereby changed from its set to its reset condition to de-energize the switch actuation means 423 and open the contacts 426, thus disconnecting slidable contact 429, and the voltage thereon, from integrator 436.

The simultaneous resetting of flip-flop 451 energizes switch actuating means 443 to close the normally open contacts 438 and close the loop which includes integrator 436, the $\sin^2 2\theta$ function 439, and the multiplying factor V/nL 441.

Thus, immediately upon determining that a speed violation is occurring the aforementioned loop is closed and begins to compute the value $d(2\theta)/dt$. More specifically the voltage representing the angle $2\theta$ is supplied from the integrator to the $\sin^2 2\theta$ function 439. The output of said $\sin^2 2\theta$ function is then multiplied by the factor $V/nL$.

In accordance with Expression 6 set forth hereinbefore, the output of the multiplying function V/nL 441, and appearing on output lead 442, is $d\,2\theta/dt$, which is supplied to integrator 436. The said integrator 436 then functions to integrate the differential function supplied thereto to produce constantly changing value $2\theta$. Such constantly changing value of $2\theta$ is, of course, represented by constantly changing voltage which is supplied to the differential amplifier, which in turn will produce an output signal to cause the servo motor 225'' to rotate in such a manner that the mirror 295'' will track precisely the speeding car 262 appearing in the outside lane of FIG. 7. Such tracking will occur, however, for only a few miliseconds, at which time the camera is caused to take a picture of the car.

Reference is made to FIG. 8 wherein the output of the picture taking decision means 293 is supplied to camera operating solenoid 297 (FIG. 7) which is energized thereby to operate the camera 296.

It might also be noted that the output of picture taking decision means 293 of FIG. 8 is also shown as pulse 168 in FIG. 4 which is supplied through a camera interface 124' to the camera solenoid 124'.

It is to be noted that the camera relay solenoid 125' of FIG. 4 must be designed so that there will be a delay of a few miliseconds in the operation thereof after the output pulse 168 from the picture taking decision means is supplied thereto. Such delay is necessary in order for the tracking function to begin before the picture is taken. It is apparent that tracking must be in process at the time that the picture is taken in order to avoid a blurred picture.

It is to be understood that the forms of the invention shown and described herein are but preferred embodiments thereof and that many modifications of the invention can be made without departing from spirit or scope of the invention. For example many different arrangements of logic can be employed to carry out the various functions of the system.

I claim:

1. Multi-lane traffic monitoring means for a roadway having a plurality of traffic lanes, said means comprising:
   in each of said traffic lanes, a first sensing means and a second sensing means, the second sensing means of each lane being spaced a predetermined distance from the first sensing means of that lane, the first sensing means of each lane being actuatable by a monitored vehicle passing thereby to generate a start-timing signal and the second sensing means of each lane being actuatable by passage thereby of such vehicle to generate a stop-timing signal;
   a plurality of delay-signal producing means each connected to receive each start-timing signal of a respective, corresponding one of the first sensing means in a given lane and responsive thereto to emit a delay-inducing signal of a first class, which signal is of a predetermined duration and which begins at a predetermined time subsequent to reception of the respective start-timing signal by the respective delay-signal producing means;
   Controlling means responsive to the concurrence of actuation of the first sensing means in any given one of said lanes and a non-emitting condition of the corresponding one of the delay-signal producing means for providing a computation-initiating signal;
   each of the delay-signal producing means being unaffected by the computation-initiating signal when the same has resulted from a start-timing signal from the first sensing means corresponding to that delay-signal producing means and each of the delay-signal producing means being responsive to the computation-initiating signal for producing a delay-inducing signal of a second class when the computation-initiating signal has resulted from a start-timing signal from a one of the first sensing means other than the first sensing means corresponding to that delay-signal producing means;
   the controlling means being responsive to the concurrency of delay-inducing signals of the first class and delay-inducing signals of the second class to prevent generation of a computation-initiating signal during the existence of said concurrency;
   computing means, responsive to the computation-initiating signal and to a subsequent stop-timing signal from actuation of the second sensing means of the same lane as that of the first sensing means, the actuation of which has been responded to by the controlling means, for producing a first output signal v representative of the velocity of the monitored vehicle;
   first logic means responsive to the output signal v for producing a second output signal e if the output signal v lies within predetermined values; and
   recording means responsive to the second output signal e for recording an image of the monitored vehicle.

2. Multi-lane traffic monitoring means in accordance with claim 30 comprising:
   pulse generating means responsive to the output signal e for generating a signal having a predetermined duration in time; and
   in which each of said plurality of delay signal producing means is responsive to said signal generated by said pulse generating means for generating a delay-inducing signal of a third class.

3. Multi-lane traffic monitoring means in accordance with claim 2 comprising:
   logic control means for sensing the lane in which the monitored vehicle is traveling and responsive to said output signal v for causing said recording means to optically track said monitored vehicle and to begin said optical tracking in a sequence wherein the image of said vehicle is recorded at a predetermined time after the optical tracking begins.

4. Multi-lane traffic monitoring means in accordance with claim 30 comprising:
   logic control means for sensing the lane in which the monitored vehicle is traveling and responsive to said output signal v for causing said recording means to optically track said monitored vehicle and to begin said optical tracking in a sequence wherein the image of said vehicle is recorded at a predetermined time after the optical tracking begins.

5. Multi-lane traffic monitoring means in accordance accordance with claim 1 in which said computing means comprises:

said logic means for sensing nd responding to the expiration of a time interval of a predetermined length occurring between the initiation of said computation-initiating signal and actuation of the second sensing means in a one of the lanes, actuation of the first sensing means of which lane has been responded to by the controlling means to provide the computation-initiating signal, for periodically energizing each of said plurality of delay-signal producing means at a rate sufficient to maintain each of said plurality of delay-signal producing means in a continuously energizing state;

said second logic means being further responsive to actuation of said second sensing means of said one of the lanes by said monitored vehicle for terminating said periodic energization of each of said plurality of delay-signal producing means.

6. Multi-lane traffic monitoring means for a roadway having a plurality of traffic lanes, said means comprising:

a pair of sensing means, comprising a first sensing means and a second sensing means positioned apart a predetermined distance d in each lane of traffic, for producing start-timing and stop-timing signals, respectively, in response to actuation by passing vehicles;

a plurality of pulse generating means of a first class, one of each of said pulse generating means being responsive to each actuation of a corresponding one of said first sensing means for generating a first delay-inducing signal having a predetermined duration in time;

storage means for storing a first scalar quantity representative of said predetermined distance;

control circuit means responsive to actuation, by a monitored vehicle, of the first sensing means of any given pair of said sensing means when said pulse generating means of said first class corresponding to said first sensing means is deenergized for producing a computation initiating signal;

time measuring means energizable to measure the time interval between said computation initiating signal and the actuation of the second sensing means of said given pair of sensing means for producing a second scalar quantity representative of said time interval;

computing means having a computation cycle and responsive to the production of said second scalar quantity for dividing said first scalar quantity thereby to produce an output signal $v$ which is representative of the average velocity of said vehicle during said time interval;

each of said plurality of pulse generating means of said first class, other than the pulse generating means of said class energized by actuation of said first sensing means, being responsive to said computation initiating signal to become energized thereby;

means responsive to the output signal $v$, when said signal $v$ lies within predetermined values, for producing an output signal $e$; and recording means responsive to said output signal $e$ for recording the image of said monitored vehicle.

7. Multi-lane traffic monitoring means in accordance with claim 6 comprising:

further pulse generating means responsive to the output signal $e$ for generating a second delay-inducing signal having a predetermined duration in time;

each of said pulse generating means of a first class being responsive to said second delay-inducing signal for generating a third delay-inducing signal.

8. Multi-lane traffic monitoring means in accordance with claim 7 comprising:

logic control means for sensing the lane in which the monitored vehicle is traveling and responsive to said output signal $v$ for causing said recording means to optically track said monitored vehicle and to begin said optical tracking in a sequence wherein the image of said vehicle is recorded at a predetermined time after the optical tracking begins.

9. Multi-lane traffic monitoring means in accordance with claim 6 comprising:

logic control means for sensing the lane in which the monitored vehicle is traveling and responsive to said output signal $v$ for causing said recording means to optically track said monitored vehicle and to begin said optical tracking in a sequence wherein the image of said vehicle is recorded at a predetermined time after the optical tracking begins.

10. Multi-lane traffic monitoring means in accordance with claim 6 and further comprising:

logic means, including said time measuring means, for sensing and responding to the expiration of a time interval of a predetermined length occurring between the initiation of said computation-initiating signal and the actuation of said second sensing means in one of the lanes, actuation of the first sensing means of which lane has been responded to by the controlling means to provide the computation-initiating signal, for periodically energizing said pulse generating means of a first class at a rate sufficient to maintain said pulse generating means of said first class in a continuously energized state;

said logic means being further responsive to actuation of said second sensing means of said one of the lanes by said monitored vehicle for terminating said periodic energization of said pulse generating means of a first class.

11. Multi-lane traffic speed monitoring means comprising:

a pair of sensors comprising a start-timing sensor and a stop-timing sensor positioned apart a predetermined distance d in each lane of traffic, the pair of sensors in each lane constituting means for generating start-timing and stop-timing signals, respectively, in response to actuation of the sensors by passing vehicles;

a separate pulse generating means of a first class connected to each start-timing sensor and energizable in response to each actuation of the connected start-timing sensor to generate a delay-inducing signal of a first class having a predetermined duration in time;

a controlling means responsive to a given set of conditions consisting of the actuation of the start-timing sensor by a monitored vehicle in a given lane and the concurrent non-energization of the pulse generating means of said first class connected thereto for producing a cycle initiating signal;

computing means having a cycling state and a non-cycling state for computing the velocity of the monitored vehicle when in its cycling state;

said computing means being responsive to said cycle initiating signal to enter its cycling state and further responsive to the stop-timing signal generated by said stop-timing sensor in the said given lane to produce an output signal v representative of the velocity of said monitored vehicle;

each of the pulse generating means of said first class other than the one of said pulse generating means of said first class connected to the start-timing sensor in said given lane being responsive to said cycle initiating signal for emitting a delay-inducing signal of a second class for preventing further occurrence of said given set of conditions during said cycling state;

means responsive to the output signal $v$, when said signal $v$ lies within predetermined values, for producing an output signal $e$; and recording means responsive to said output signal $e$ for recording the image of said monitored vehicle.

12. Multi-lane traffic speed monitoring means in accordance with claim 11 comprising:

pulse generating means of a second class and responsive to the signal $e$ for generating a delay-inducing signal having a predetermined duration in time;

each of said pulse generating means of the first class being responsive to said delay-inducing signal produced by the pulse generating means of the second class for generating a delay-inducing signal.

13. Multi-lane traffic speed monitoring means in accordance with claim 12 comprising:

logic control means for sensing the lane in which the monitored vehicle is traveling and responsive to said output signal $v$ for causing said recording means to optically track said monitored vehicle and to begin said optical tracking in a sequence wherein the image of said vehicle is recorded at a predetermined time after the optical tracking begins.

14. Multi-lane traffic monitoring means in accordance with claim 11 comprising:

logic control means for sensing the lane in which the monitored vehicle is traveling and responsive to said output signal $v$ for causing said recording means to optically track said monitored vehicle and to begin said optical tracking in a sequence wherein the image of said vehicle is recorded at a predetermined time after the optical tracking begins.

15. Multi-lane traffic speed monitoring means in accordance with claim 11 in which said computing means comprises:

logic means for sensing and responding to the expiration of a time interval of a predetermined length occurring between the initiation of said cycle initiating signal and the actuation of the stop-timing sensor by the monitored vehicle for periodically energizing said pulse generating means of said first class at a rate sufficient to maintain said pulse generating means of said first class in a continuously energized state;

said logic means being further responsive to actuation of said stop-timing sensor actuated by said monitored vehicle for terminating said periodic energization of said pulse generating means of said first class.

16. A traffic monitoring means comprising:

start-timing and stop-timing sensors positioned in a lane of traffic and spaced apart a predetermined distance for generating start-timing and stop-timing signals, respectively, in response to passing vehicles;

a first pulse generating means responsive to each actuation of said start-timing sensor for generating a first delay-inducing signal having a predetermined duration in time;

storage means for storing a first scalar quantity $d$ representative of said predetermined distance;

control circuit means responsive to actuation, by a monitored vehicle, of said start-timing sensor while said first pulse generating means is de-energized for producing a computation initiating signal;

time measuring means energized in response to said computation initiating signal for measuring the time interval between said computation initiating signal and actuation of said stop-timing sensor and producing a second scalar quantity representative of said time interval;

computing means having a computation cycle and responsive to the generation of said second scalar quantity to divide said first scalar quantity $d$ thereby to produce an output signal $v$ which has a value representative of the average velocity of said monitored vehicle during said time interval;

means responsive to the output signal $v$, when said signal $v$ lies within predetermined values, for producing an output signal $e$;

recording means responsive to said output signal $e$ for recording the image of said monitored vehicle; and tracking means responsive to the said output signal $v$ and the value thereof for causing said recording means to optically track said monitored vehicle.

17. A traffic monitoring means in accordance with claim 16 and further comprising:

further pulse generating means responsive to the output signal $e$ for generating a second delay-inducing signal having a predetermined duration in time, said first pulse generating means being responsive to said second delay-inducing signal to generate a third delay-inducing signal.

18. A traffic monitoring means in accordance with claim 16 and further comprising:

logic means for sensing and responding to the expiration of a time interval of a predetermined length occurring between the initiation of said computation initiating signal and the actuation of the stop-timing sensor by the monitored vehicle for periodically energizing said first pulse generating means at a rate sufficiently high to maintain said first pulse generating means in a continuously energized state and to inhibit the recording of an image of said monitored vehicle;

said logic means being further responsive to actuation of said stop-timing sensor by said monitored vehicle for terminating said periodic energization of said first pulse generating means.

19. A traffic monitoring means comprising:

a pair of start-timing and stop-timing sensors positioned in a traffic lane a predetermined distance $d$ apart and actuated by a vehicle passing thereby to generate start-timing and stop-timing signals respectively;

a delay-signal producing means connected to receive each start-timing signal and responsive thereto for emitting a delay-inducing signal which is of a first class, has a predetermined duration of existence in time, and begins at a predetermined time subsequent to reception of the start-timing signal by the delay-signal producing means;

control means responsive to the concurrence of actuation of said start-timing sensor and to the non-emitting condition of said delay-signal producing means to provide a computation initiating signal;

said control means being responsive to said delay-inducing signal of said first class for preventing generation of an additional computation initiating signal by actuation of said start-timing means during the existence of said delay-inducing signal of said first class;

computing means responsive to said computation initiating signal and to the stop-timing signal from the subsequent actuation of said stop-timing sensor to produce a first output signal $v$ representative of the velocity of the monitored vehicle;

logic means for producing a second output signal $e$ if said output signal $v$ lies within a predetermined range;

recording means responsive to said second output signal $e$ for recording an image of said monitored vehicle; and tracking means responsive to said output signal $v$ for causing said recording means to optically track said monitored vehicle.

20. A traffic monitoring means in accordance with claim 19 and further comprising:

pulse generating means responsive to the output signal $e$ for generating a delay-inducing signal of a second class and having a predetermined duration in time, said delay-signal producing means being responsive to said delay-inducing signal of the second class for generating a delay-inducing signal of a third class.

21. A traffic monitoring means in accordance with claim 19 and comprising:

logic means for sensing and responding to the expiration of a time interval of a predetermined length occurring between the initiation of said computation initiation signal and the subsequent actuation of said stop-timing sensor, actuation of the start-timing sensor of which lane has been responded to by the control means to provide the computation initiation signal, for periodically energizing said delay-signal producing means at a rate sufficient to maintain said delay-signal producing means in a continuously emitting state;

said logic means being further responsive to actuation of said stop-timing sensor by said monitored vehicle for terminating said periodic energization of said delay-signal producing means.

22. A traffic monitoring system for vehicles moving in a predetermined path of movement, said system including:

detector means for detecting vehicles moving in the predetermined path and providing an electric output which varies in accordance with the speed of movement of a vehicle moving in the said path;

control means operatively associated with said detector means responsive to the output of said detector means for providing a control output signal when the speed of a vehicle moving in said path exceeds a predetermined value, said control output signal varying in accordance with the speed of the vehicle;

camera means positioned adjacent said path for photographing the front end of a vehicle moving in said path after said detector means have produced said output after detecting the vehicle, said camera means having a light sensitive means on which images of the front ends of the vehicles moving in said predetermined path are projectable;

tracking means operatively associated with said camera means and responsive to said output signal of said control means for tracking the vehicle in accordance with its speed and for causing the image of a vehicle moving in said predetermined path whose speed exceeds said predetermined value to be projected on the light sensitive means of the camera means without movement of said image on said light sensitive means during the period of operation of said camera means; and means responsive to said control output signal for operating said camera means during the period of time said tracking means is tracking the movement of a vehicle whose speed exceeds said predetermined value.

23. The traffic monitoring system of claim 22, wherein said tracking means comprises a mirror and means for moving said mirror in accordance with said output signal of said control means for causing the image of the front end of the vehicle whose speed exceeds said predetermined value to be projected to said light sensitive means of said camera means.

24. The traffic monitoring system of claim 22, wherein said detector means comprises first and second sensors spaced apart a predetermined distance and operable successively by each vehicle moving in said path, the time period between successive operations of said first and second sensors varying in accordance with the speed of the vehicle.

25. The traffic monitoring system of claim 24, wherein said tracking means comprises a mirror and means for moving said mirror in accordance with said output signal of said control means for causing the image of the front end of the vehicle whose speed exceeds said predetermined value to be projected to said light sensitive means of said camera means.

26. A traffic monitoring system for vehicles moving a plurality of parallel, predetermined paths of movement, said system including:
- separate detector means operatively associated with each of said paths for detecting vehicles moving in said paths and each providing an electric output which varies in accordance with the speed of movement of a vehicle moving in its associated path;
- control means operatively associated with said detector means and responsive to the outputs of said detector means for providing a control output signal when the speed of a vehicle moving in any one of the paths exceeds a predetermined value, said control output signal varying in accordance with the speed of the vehicle;
- camera means positioned adjacent said paths for photographing the driver and the front end of a vehicle moving in any one of said paths after the detector means associated with the path in which the vehicle is moving has provided an electric output responsive to the movement of the vehicle in the path, said camera means having a light sensitive means on which an image of the front end of a vehicle traveling in any one of said paths is projectable;
- tracking means operatively associated with said camera means and responsive to the output signal of said control means for tracking a vehicle in accordance with its speed and for causing the image of a vehicle moving in one of the paths whose speed exceeds said predetermined value to be maintained on the light sensitive means of the camera means without movement of said image on said light sensitive means during the period of operation of said camera means; and
- means responsive to said control output signal for operating said camera means during the period of time in which said tracking means is tracking the movement of a vehicle, in one of said paths, whose speed exceeds said predetermined value.

27. The traffic monitoring system of claim 26, wherein said tracking means comprises a mirror and means for moving said mirror in accordance with said output signal of said control means for causing the image of the front end of the vehicle whose speed exceeds said predetermined value to be projected to said light sensitive means of said camera means.

28. The traffic monitoring system of claim 26, wherein each of said detector means comprises first and second sensors spaced apart a predetermined distance and operable successively by each vehicle moving in the associated path.

29. The traffic monitoring system of claim 28, wherein said tracking means comprises a mirror and means for moving said mirror in accordance with said output signal of said control means for causing the image of the front end of the vehicle whose speed exceeds said predetermined value to be projected to said light sensitive means of said camera means.

* * * * *